United States Patent [19]

Kurosawa et al.

[11] Patent Number: 5,463,202
[45] Date of Patent: Oct. 31, 1995

[54] LASER MACHINING APPARATUS AND METHOD

[75] Inventors: Miki Kurosawa; Shuji Ogawa; Masayuki Sugahara, all of Aichi; Kiyoshi Funai, Hyogo; Takashi Yumura, Hyogo; Tetsu Yamamoto, Hyogo, all of Japan

[73] Assignee: Mitsubishi Denki Kabushiki Kaisha, Tokyo, Japan

[21] Appl. No.: 120,829

[22] Filed: Sep. 15, 1993

[30] Foreign Application Priority Data

Dec. 28, 1992 [JP] Japan ................................ 4-348438
Feb. 15, 1993 [JP] Japan ................................ 5-025277

[51] Int. Cl.$^6$ ............................................. B23K 26/00
[52] U.S. Cl. ............................. 219/121.83; 219/121.62; 372/29
[58] Field of Search ..................... 219/121.61, 121.62, 219/121.67, 121.68, 121.69, 121.7, 121.75, 121.74, 121.83; 372/29, 31

[56] References Cited

U.S. PATENT DOCUMENTS 5,059,760 10/1991 Iehisa et al. ...................... 219/121.83
5,373,135 12/1994 Beyer et al. ...................... 219/121.83

FOREIGN PATENT DOCUMENTS 3050326 4/1982 Germany.
4106008 8/1992 Germany.
52-67595 6/1977 Japan ................................ 372/29
58-205689 11/1983 Japan.
61-219489 9/1986 Japan.
1-152783 6/1989 Japan ................................ 372/29
2-165886 6/1990 Japan ................................ 219/121.83
2179374 7/1990 Japan.
323092 1/1991 Japan.
491880 3/1992 Japan.
4105780 4/1992 Japan.
92/14578 9/1992 WIPO ............................ 219/121.83

Primary Examiner—Geoffrey S. Evans
Attorney, Agent, or Firm—Sughrue, Mion, Zinn, Macpeak & Seas; Richard C. Turner; Peter A. McKenna

[57] ABSTRACT

A method and apparatus for detecting the machining status of a laser beam machining device, having a multi-mirror resonator for generating a machining beam, which utilizes the secondary light generated by the machining operation and returned from the workpiece surface into the resonator for control of the machining operation. The oscillator and accompanying components, such as beam dividing mirrors and splitters, are operative to separate the secondary light from the laser beam within the resonator and direct the two beams separately to detectors located outside of the resonator. Alternatively, the secondary light and laser beam may be directed to the outside together where they are separated by an integrating sphere for detection.

25 Claims, 15 Drawing Sheets

BEFORE COMPLETION OF PIERCING

AFTER COMPLETION OF PIERCING

LASER MACHINING APPARATUS AND METHOD

BACKGROUND OF THE INVENTION

1. Field of the Invention

The present invention relates to a laser cutting machine and specifically to light sensors used for focusing, cutting fault detection, and the like.

2. Description of the Background Art

In a laser cutting machine for cutting a workpiece with a laser beam, the cut state of the workpiece must be monitored continuously in order to reduce the time of piercing conducted at the start point of cutting, to prevent blow-up during piercing and to prevent a cutting fault, e.g., gouging, burning or dross sticking. For this purpose, an apparatus is required for detecting and monitoring a beam generated on the cut surface of the workpiece during cutting.

FIG. 29 shows a visible light detector apparatus for use in a conventional laser cutting machine disclosed, for example, in Japanese Laid-Open Patent Publication No. HEI4-91880 or in Japanese Laid-Open Patent Publication No. HEI4-105780. In this drawing, the numeral 1 indicates a light sensor using a photoelectric device or a camera device, 2 denotes a cutting head, 3 designates a cutting lens, 4 represents a nozzle, 5 indicates a mirror for reflecting a light from a cut surface in the direction of the sensor, 6 designates a window provided in the cutting head 2, 7 represents a detection section for judging piercing completion, a cutting fault and the like based on the light detected by the light sensor, 8 denotes a laser beam, 9 indicates a light from a workpiece, 10 represents an NC apparatus, 11 denotes a bend mirror, 12 designates a laser oscillator, and W indicates a workpiece.

In the conventional laser cutting machine constructed as described above, when the workpiece W is irradiated with the laser beam 8, part of a light generated on the cut surface due to the fusion or the like of an irradiation point is reflected by the mirror 5 and received by the light sensor 1. The change in intensity of such light is detected by the light sensor 1, piercing completion timing or cutting fault occurrence is detected by the detection section 7, and this information is transmitted to the NC apparatus 10 to control the laser cutting machine.

In the aforementioned conventional laser cutting machine, the mirror and sensor fitted to the cutting head adjacent to the workpiece may interfere with the operation of the machine and may be contaminated by fumes and/or spatter produced by the workpiece during cutting, or may be damaged by the scattered light of the laser beam. Such effects make the stable long-time operation of the machine difficult. Also, since the mirror must be disposed in a position where it is not exposed to the laser beam, typically the top, the cut area cannot be viewed from that convenient perspective. At other viewing positions, there may be an insufficient quantity of light, resulting in a low detection sensitivity, a difficulty in obtaining the real image of a cut point, and an insufficient amount of operational data. Further, if the cutting head contains the sensor, all cutting heads which may be used in the cutting operation must be equipped with a sensor mechanism, thereby resulting in a high price.

It is, accordingly, an object of the present invention to overcome the disadvantages in the conventional designs by providing a low-priced laser cutting machine which allows stable operation to be performed for a long time, the real image of the cut point to be obtained, detection sensitivity to be high, and only one sensor mechanism to be required for the apparatus.

SUMMARY OF THE INVENTION

The laser cutting machines of the several embodiments of the invention allow part of the light returning reversely along the beam guiding path out of the light generated on the cut surface of the workpiece to be fetched from the resonator of the laser oscillator separately from the laser beam and detected.

In accordance with further features of the invention, there are several useful results that can be obtained from the separately detected light.

The laser machining apparatus of the present invention allows the focal position of the optical system to be detected.

The invention allows at least either of piercing completion and a fault during piercing to be detected.

The laser cutting machine of the present invention allows the machining status at the machining point of the workpiece to be detected.

The laser cutting machine of the invention allows the machining conditions to be controlled on the basis of the focal position, the piercing completion or the fault during piercing, and the machining status at the machining point of the workpiece.

The laser machining apparatus of the invention allows feedback control along the machining path to be exercised on the basis of the information detected.

The laser machining apparatus of the invention allows a cutting head nozzle hole relative to the laser beam and the misalignment of the optical condenser system to be compensated for.

The laser machining apparatus of the invention allows any inclinations of the resonator mirrors and light guiding path mirror to be changed, in order to compensate for any beam axis offset.

The laser machining apparatus of the invention allows the condenser to be moved in the beam axis direction to make the focus distance of the condenser variable.

The laser machining apparatus of the invention allows the distance from a cutting lens to the workpiece surface to be detected.

The laser machining apparatus of the invention allows any active supporting mechanisms for adjusting the angles of the resonator mirrors to be controlled to compensate for errors in beam mode.

The laser machining method of the invention enables the automatic control of at least one of the laser oscillator oscillation condition, the cutting gas state, the focal position, the feedrate and the nozzle state on the basis of the focal position, the piercing completion, the piercing fault, or the cutting status at the machining point of the workpiece.

The laser machining method of the invention allows automatic feedback control to be exercised along the cutting path on the basis of the information detected from the machining point.

The laser machining method of the invention allows the misalignment of the nozzle hole and the optical condenser system relative to the laser beam to be compensated for automatically.

The laser machining method of the invention allows the inclinations of the resonator mirrors and light guiding path mirror to be changed to compensate for the beam axis offset automatically.

DESCRIPTION OF THE PREFERRED EMBODIMENTS

Embodiment 1

Figure 1:
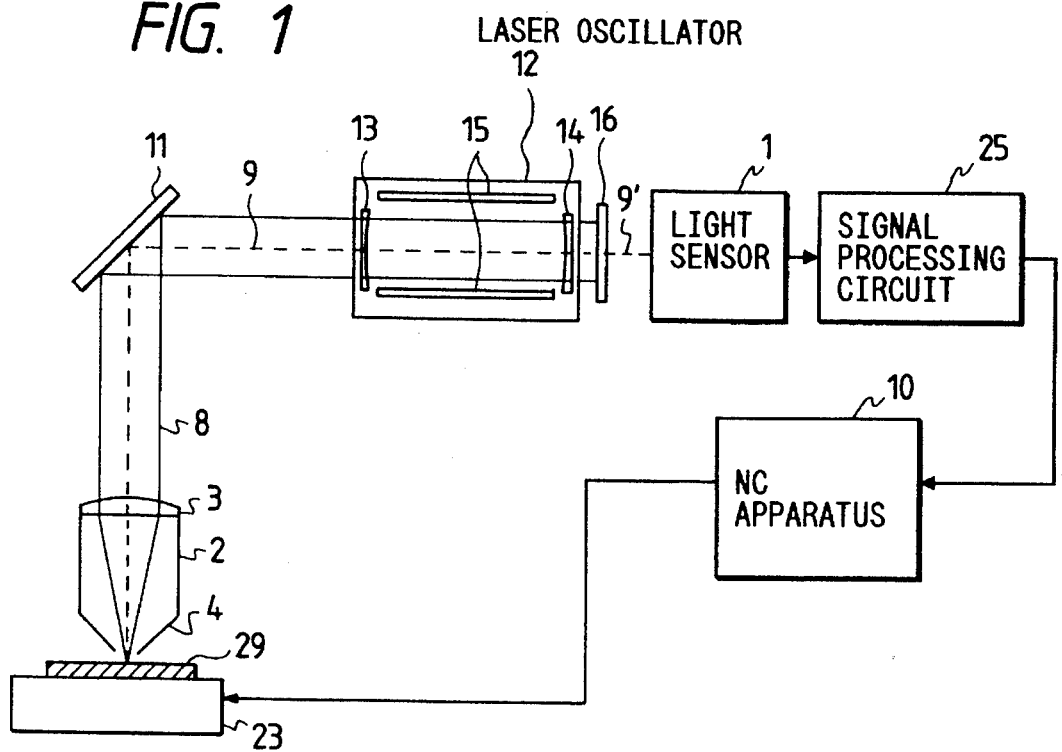
FIG. 1 illustrates a laser cutting machine in accordance with a first preferred embodiment of the invention.

FIG. 1 is an arrangement diagram illustrating a first embodiment of the invention, wherein the numeral 1 indicates a light sensor, 2 designates a cutting head including a nozzle 4 and a cutting lens 3, 8 represents a laser beam, 9 denotes a light generated on the cut surface of a workpiece W and returning therefrom, 10 indicates an NC apparatus for controlling a drive table 23 for moving the workpiece W to be cut with the laser beam 8, 11 represents a bend mirror disposed in a light guiding path, 12 denotes a laser oscillator which excites molecules by means of a discharge formed between electrodes 15 and induces and delivers the same to provide the laser beam, 13 designates a partial transmission mirror as one of the resonator mirrors of the laser oscillator for removing the laser beam, and 14 indicates a rear mirror as one of the resonator mirrors of the laser oscillator. The mirror 14 used in made by coating ZnSe (zinc selenide) or the like with a multilayer film to ensure that its reflectance is approximately 100% for the laser beam and several ten % for the other light (especially a visible light). Hence, part of the light 9 which had been generated on the cut surface and returned reversely along the light guiding path into the laser oscillator can be fetched to the outside of the resonator. 16 denotes a wavelength selection filter, e.g., a colored glass, which may be contained in the light sensor 1, for completely removing a laser beam component out of the light 9 passing through the rear mirror 14 to prevent the light sensor 1 from being damaged and for selectively passing a light in the wavelength region of high detection sensitivity. 9' designates a light that has been completely deprived of a laser beam component after a light 9 that has been generated on the cut surface of the workpiece W and returning therefrom has passed through the wavelength selection filter 16. The light sensor 1 employed is the one having high detection sensitivity relative to the wavelength region of the light 9' which is output from the wavelength selection filter 16, and may be a single light-receiving device like an Si photodiode or a camera device like a CCD where light-receiving devices are integrated in an array form. The single device can detect a change in intensity of emission at the cut point and the camera device can detect a change in intensity distribution or color (wavelength) of the emission from the real image of the cut point in addition to a change in intensity of the emission at the cut point.

In the above design, the light sensor 1 and the mirror for introducing the light to the light sensor 1 need not be disposed adjacent to the workpiece as in the cutting head, whereby the conventional disadvantages of damage due to the scattered light of the laser beam and low sensitivity because of an insufficient light volume can be solved, the whole apparatus made compact, and the detection mechanism enhanced in reliability.

Embodiment 2

Figure 2:
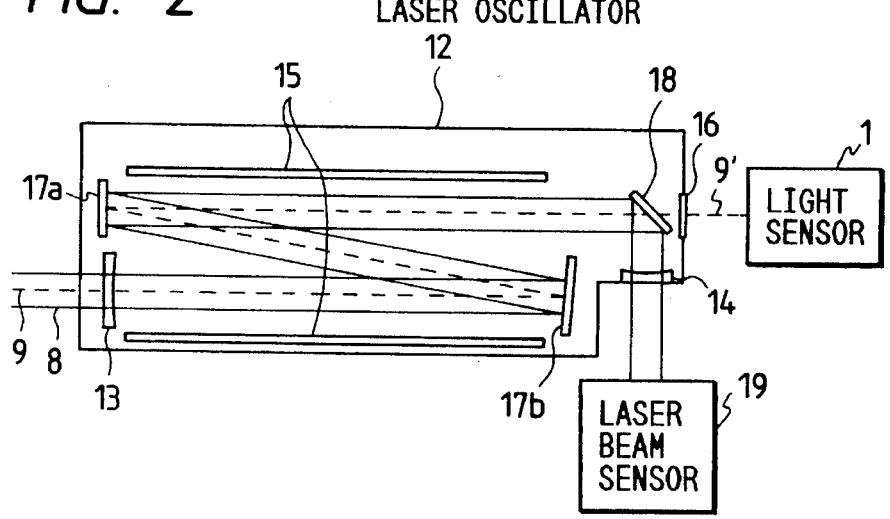
FIG. 2 shows a laser cutting machine in accordance with a second preferred embodiment of the invention.
Figure 3:
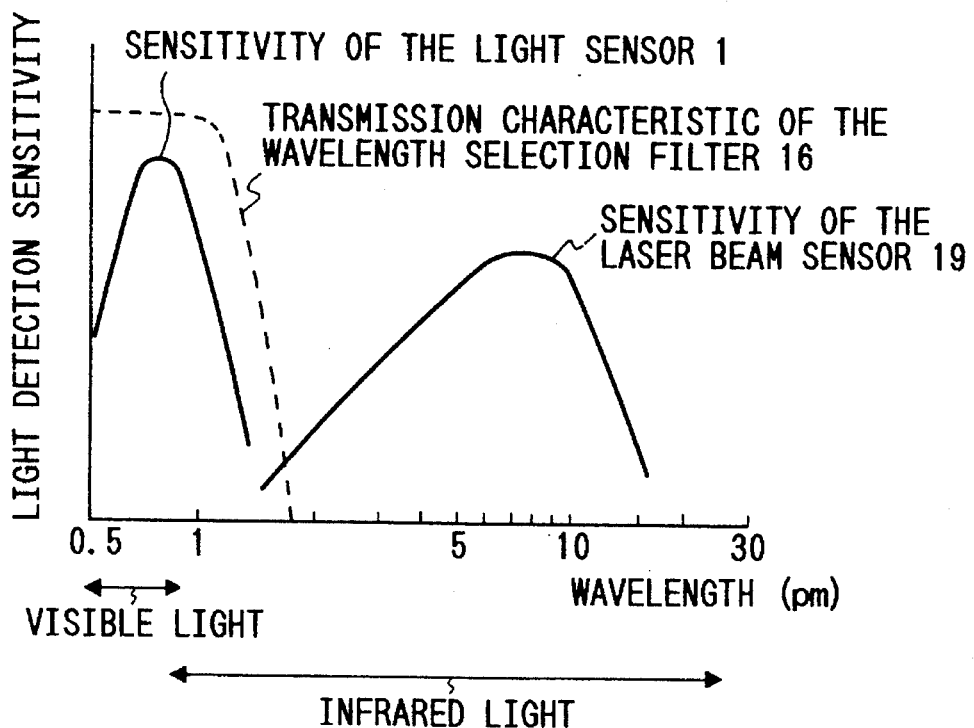
FIG. 3 is a characteristic diagram of the light detection sensitivities of sensors shown in FIG. 2.

FIG. 2 is an arrangement diagram showing a laser oscillator of a laser cutting machine according to a second embodiment of the invention, wherein 17a, 17b and 18 indicate mirrors for defining resonance beam axes in the laser oscillator. Among these mirrors, the mirror 18 is a beam splitter which, like the rear mirror 14, has reflectance of approximately 100% for the laser beam and several ten % for the other light (especially for visible light) and has been manufactured, for example, by coating ZnSe (zinc selenide) with a multilayer film, and which may function to linear-polarize the output laser beam by utilizing the difference in reflectance due to polarization. 19 denotes a laser light sensor, i.e., a thermo-electric converter device like a thermopile or a photo-electric converter device like HgCdTe, for detecting the laser beam 8 which has slightly passed the rear mirror 14. The light 9 having returned to the laser oscillator passes through the mirror 18, is completely deprived of a laser beam component through the wavelength selection filter 16, and is detected by the light sensor 1 such as an Si photodiode. FIG. 3 shows an example of the light detection sensitivities of the light sensor 1 and the laser light sensor 19 and the transmission characteristic of the wavelength selection filter 16, wherein the light can be detected without any interference with the sensor sensitivities if the center of the sensitivity of the light sensor 1 is in the visible light region, the sensitivity of the laser light sensor 19 is in the infrared light region, and the wavelength selection filter 16 is of the visible light transmission type. This light sensor 1 may be a single light-receiving device like an Si photodiode or a camera device like a CCD where light-receiving devices are integrated in an array form. The single device can detect a change in intensity of the emission at the cut point and the camera device can detect a change in intensity distribution or color (wavelength) of the emission from the real image of the cut point in addition to the change in intensity of the emission at the output point. The above arrangement allows the detection of the laser beam for monitoring the laser output and the detection of the other beam produced at the cut point and returning to the laser oscillator to be conducted at the same time.

Instead of the mirror 18 defined as the beam splitter in the present embodiment, another resonator mirror such as 17a or 17b may be used as the beam splitter and the wavelength selection filter 16 and the light sensor 1 disposed there behind to produce the same effect.

Embodiment 3

Figure 4:
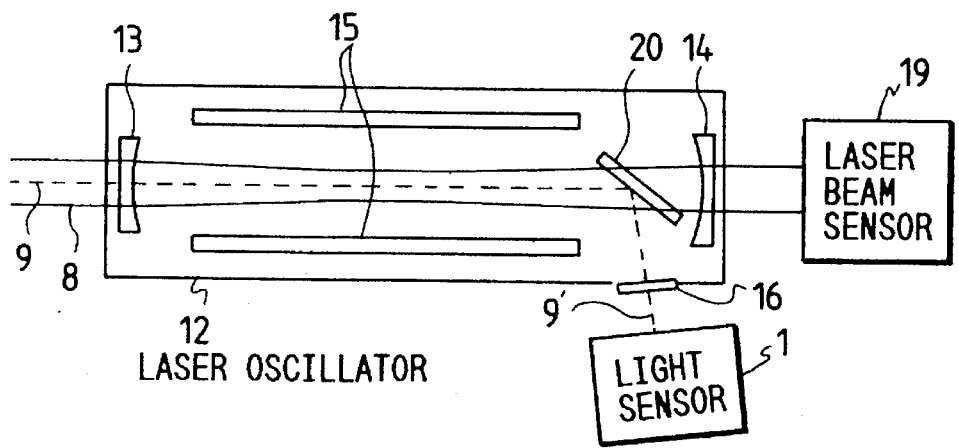
FIG. 4 features a laser cutting machine in accordance with a third preferred embodiment of the invention.

FIG. 4 is an arrangement diagram showing a laser oscillator of a laser cutting machine according to a third embodiment of the invention, wherein 20 indicates a beam splitter which is disposed between resonance mirrors in the laser oscillator of the laser cutting machine. The beam splitter is manufactured by a material, such as GaAs (gallium arsenide), for passing approximately 100% of the laser beam and reflecting approximately 100% of the other light, and may be disposed such that the incident angle of the laser beam is the Brewster angle to linear-polarize the laser beam 8.

The light 9 produced at the cut point and returned to the laser oscillator is reflected by the beam splitter 20, passes through the wavelength selection filter 16, and is detected by the light sensor 1. The laser beam 8 passing through the beam splitter 20 slightly passes through the rear mirror 14 and is detected by the laser light sensor 9. This allows the detection of the laser beam for monitoring the laser output and the detection of the light other than the laser beam produced at the cut point and returning to the laser oscillator to be made simultaneously. The light sensor 1 may be a single light-receiving device like an Si photodiode or a camera device like a CCD where light-receiving devices are integrated in an array form. The single device can detect a change in intensity of the light generated at the cut point and the camera device can detect a change in intensity distribution or color (wavelength) of the emission from the real image of the cut point in addition to the change in intensity of the emission at the cut point.

Embodiment 4

Figure 5:
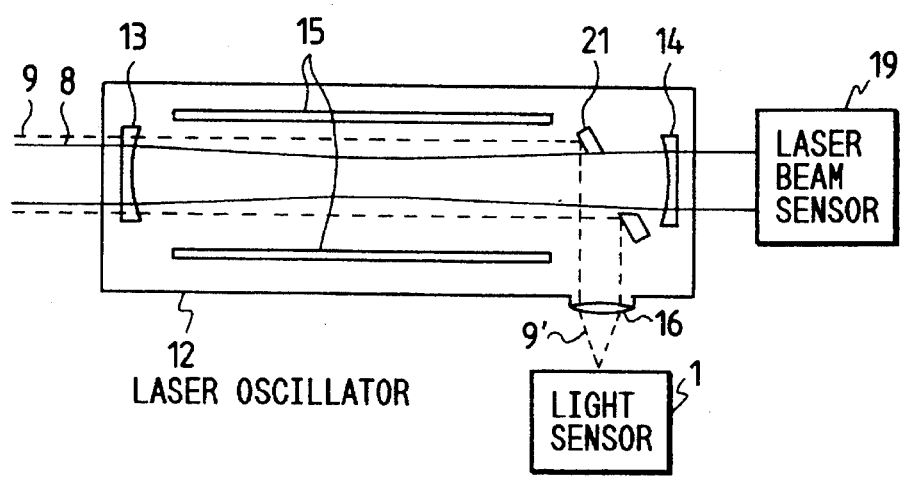
FIG. 5 is an arrangement diagram of a laser cutting machine for a fourth preferred embodiment of the invention.

FIG. 5 is an arrangement diagram showing a laser oscillator of a laser cutting machine according to a fourth embodiment of the invention, wherein 21 indicates a beam-through mirror disposed between the resonance mirrors in the laser oscillator and having in the center a hole large enough to pass the laser beam 8. The light 9 produced at the cut point and returned to the laser oscillator is reflected by said beam-through mirror 21, passes through the wavelength selection filter 16, and is detected by the light sensor 1. The wavelength selection filter 16 may have a condenser function to form the image of the cut point on the light-receiving surface of the light sensor 1. Since the hole in the beam-through mirror 21 is larger than the diameter of the laser beam 8, the laser beam 8 oscillates between the partial transmission mirror 13 and the rear mirror 14 without being obstructed by the beam-through mirror 21 and part thereof passes through the rear mirror 14 and is detected by the laser light sensor 19. This allows the detection of the laser beam for monitoring the laser output and the detection of the light other than the laser beam produced at the cut point and returning to the laser oscillator to be made simultaneously. The light sensor 1 may be a single light-receiving device like an Si photodiode or a camera device like a CCD where light-receiving devices are integrated in an array form. The single device can detect a change in intensity of the emission at the cut point and the camera device can detect a change in intensity distribution or color (wavelength) of the emission from the real image of the cut point in addition to the change in intensity of the emission at the cut point.

Embodiment 5

Figure 6:
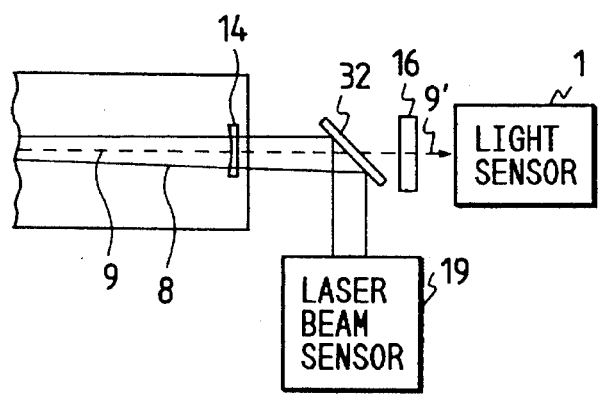
FIG. 6 shows a laser cutting machine in accordance with a fifth embodiment of the invention.

FIG. 6 is an arrangement diagram showing a laser cutting machine according to a fifth embodiment of the invention, wherein 32 indicates a beam splitter manufactured, for example, by coating ZnSe (zinc selenide) or the like with a multilayer film for separating the laser beam 8 partly fetched from the rear mirror 14 of the laser oscillator and the light 9 produced at the cut point and returning into the laser oscillator. 19 denotes a laser light sensor for detecting said laser beam 8, and 1 represents a light sensor for detecting the light 9' completely deprived of a laser beam component through the wavelength selection filter 16 out of light 9. The above design allows the detection of the laser beam for monitoring the laser output and the detection of the beam from the cut point by the light sensor to be performed simultaneously. The light sensor 1 may be a single light-receiving device like an Si photodiode or a camera device like a CCD where light-receiving devices are integrated in an array form. The single device can detect a change in intensity of the emission at the cut point and the camera device can detect a change in intensity distribution or color (wavelength) of the emission from the real image of the cut point in addition to the change in intensity of the emission at the cut point.

The beam splitter for reflecting the laser beam 8 and passing the other light 9 employed in the present embodiment may be replaced by a beam splitter made of a material, such as GaAs (gallium arsenide), for passing the laser beam 8 and reflecting the other light 9 with the positions of the laser light sensor 19 and the light sensor 1 inverted, to have the identical effect.

Embodiment 6

Figure 7:
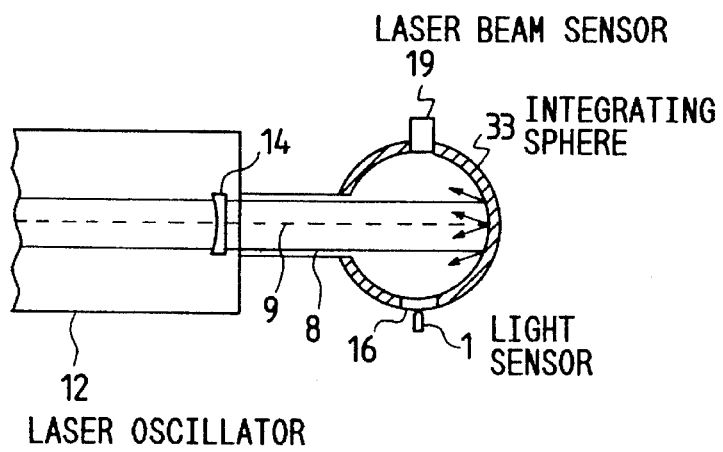
FIG. 7 is an arrangement diagram of a laser cutting machine in a sixth embodiment of the invention.

FIG. 7 is an arrangement diagram illustrating a laser cutting machine according to a sixth embodiment of the invention, wherein 33 indicates an integrating sphere for uniformly extincting the laser beam 8 partly fetched from the rear mirror 14. 19 represents a laser light sensor which can detect the laser beam component out of the light that has been reduced, integrated and/or averaged by the integrating sphere 33 to detect the output of the laser beam oscillating. Such integrating spheres are available commercially from Labsphere Corporation of New London, N.H. The light 9 other than the laser beam generated at the cut point, returning into the laser oscillator, passing through the rear mirror 14, and guided to the integrating sphere 33 is detected through the filter 16 by the light sensor 1 disposed such that the detection section is directed to the inner surface of the integrating sphere 33. This arrangement allows the detection of the laser beam for monitoring the laser output by the laser light sensor 19 and the detection of the light from the cut point by means of the light sensor 1 to be made at the same time. Further, in this arrangement, the integrating sphere replacing the beam splitter and each sensor fitted to the integrating sphere provide a low-priced, compact apparatus.

Embodiment 7

Figure 8:
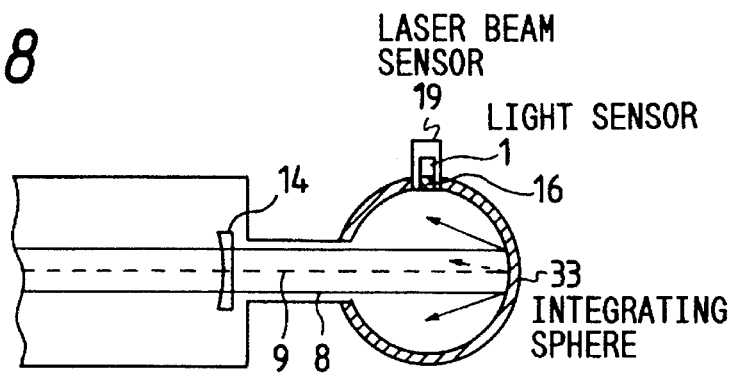
FIG. 8 illustrates a laser cutting machine as an alternative to the seventh preferred embodiment of the invention.

FIG. 8 is an arrangement diagram illustrating a laser cutting machine according to a seventh embodiment of the invention, wherein the light sensor 1 is integrated with the laser light sensor 19 and the wavelength selection filter 16. This design also produces the same effect as Embodiment 6.

Embodiment 8

Figure 9:
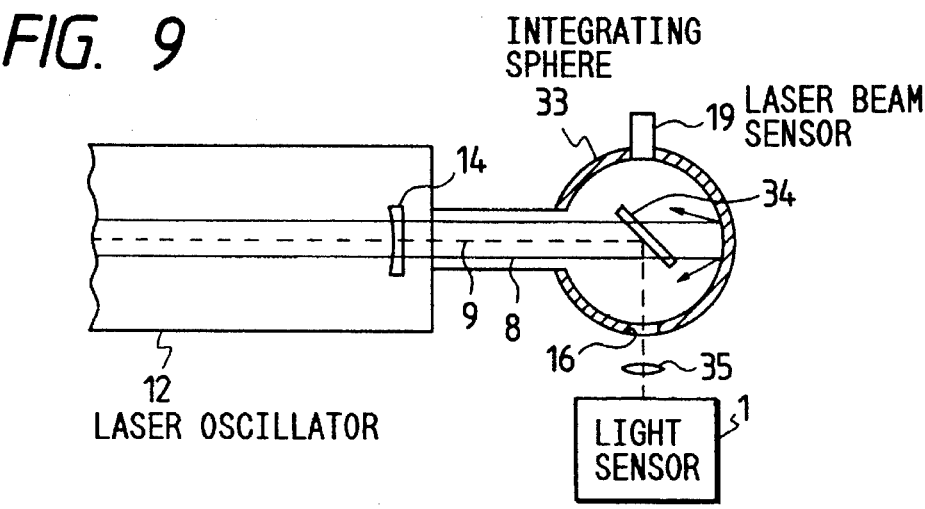
FIG. 9 is an arrangement diagram of a laser cutting machine in an eighth preferred embodiment of the invention.

FIG. 9 is an arrangement diagram showing a laser cutting machine according to a eighth embodiment of the invention, wherein 34 indicates a mirror (beam splitter) which is made of a material, such as GaAs (gallium arsenide), for passing the laser beam 8 and reflecting the other light 9 to separate the laser beam 8 and the other light 9, and is disposed in the integrating sphere 33. The laser beam component passes through the mirror 34, is processed by the integrating sphere 33, and is detected by the laser light sensor 19. The light 9 other than the laser beam generated at the cut point, which returns into the laser oscillator and comes out of the rear mirror 14, is reflected by a mirror 34, passes through the wavelength selection filter 16 and a condenser 35, and is guided to and detected by the light sensor 1. This light sensor 1 may be a single light-receiving device like an Si photodiode or a camera device like a CCD where light-receiving devices are integrated in an array form. The single device can detect a change in intensity of the emission at the cut point and the camera device can detect a change in intensity distribution or color (wavelength) of the emission from the real image of the cut point in addition to a change in intensity of the emission at the cut point. This arrangement allows the detection of the laser beam for monitoring the laser output by the laser light sensor and the detection of the light from the cut point by means of the light sensor 1 to be conducted at the same time.

Embodiment 9

Figure 10:
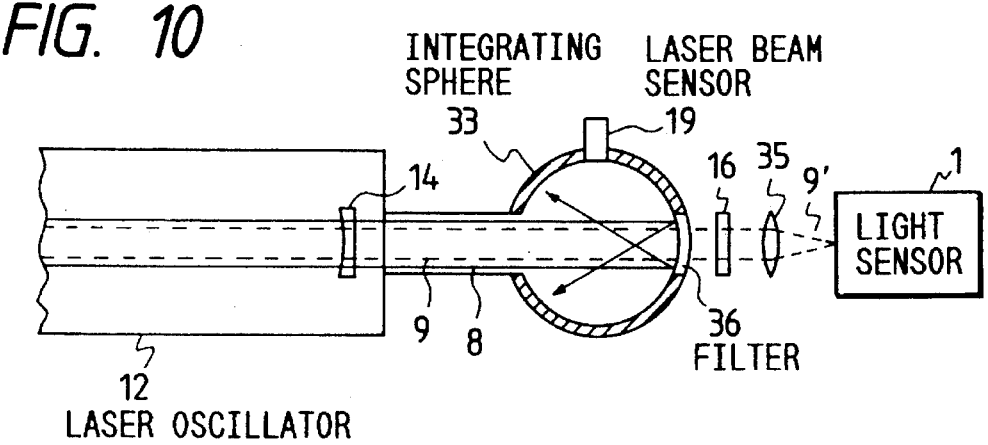
FIG. 10 is an arrangement diagram of a laser cutting machine in a ninth preferred embodiment of the invention.

FIG. 10 is an arrangement diagram showing a laser cutting machine according to a ninth embodiment of the invention, wherein 36 indicates a filter which is made of a material, such as ZnSe (zinc selenide), for reflecting approximately 100% of the laser beam and passing the other beam to separate the laser beam 8 and the other light 9, and of which area facing the inside of the integrating sphere 33 is curved similarly to the inner surface of the integrating sphere 33. The laser beam 8 and the other light 9 coming out of the rear mirror 14 are both guided into the integrating sphere 33. The laser beam 8 is reflected and diffused in the integrating sphere 33, and the other light 9 passes through the integrating sphere 33 and is guided to the light sensor 1 through the wavelength selection filter 16 and the condenser 35. This light sensor 1 may be a single light-receiving device like an Si photodiode or a camera device like a CCD where light-receiving devices are integrated in an array form. The single device can detect a change in intensity of the emission at the cut point and the camera device can detect a change in intensity distribution or color (wavelength) of the emission from the real image of the cut point in addition to a change in intensity of the emission at the cut point. Also, the laser light sensor 19 disposed on the integrating sphere 33 allows the detection of the laser beam for monitoring the laser output and the detection of the light from the cut point by means of the light sensor 1 to be made at the same time.

Embodiment 10

Figure 11:
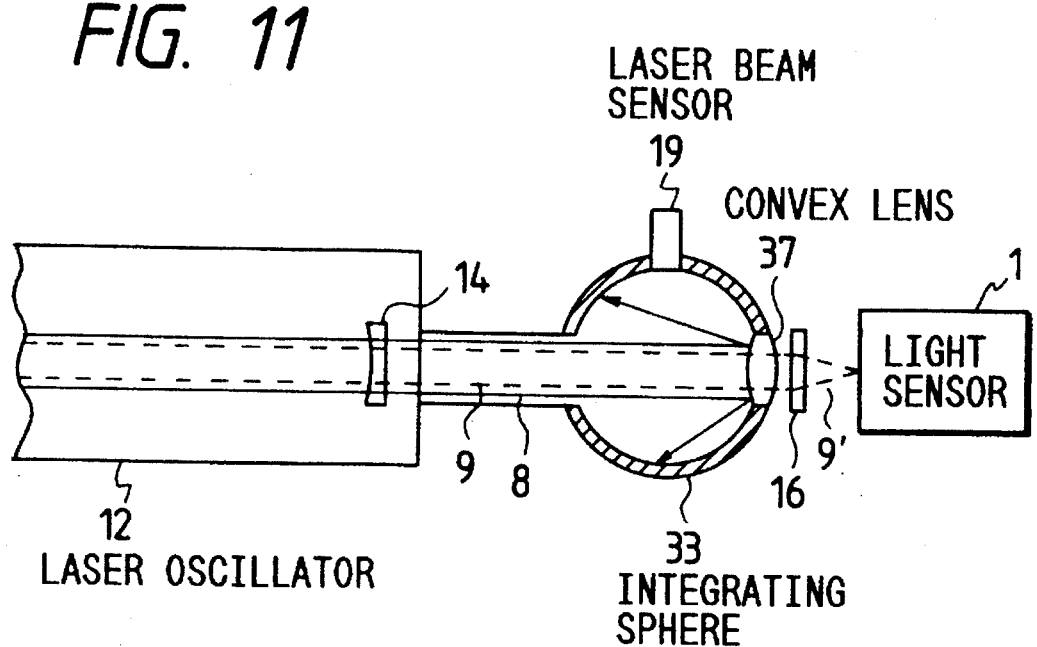
FIG. 11 is an arrangement diagram of a laser cutting machine in a tenth embodiment of the present invention.

FIG. 11 is an arrangement diagram showing another laser cutting machine according to another embodiment of the invention, wherein 37 indicates a double-convex or a flat convex lens made of a material, such as ZnSe (zinc selenide), for reflecting the laser beam 8 and passing the other light, i.e., the filter 36 shown in Embodiment 9 modified into a lens shape to provide an image-formation function. Since its area facing the inside of the integrating sphere 33 has a convex spherical surface, the laser beam component out of the light produced at the cut point, returning to the laser oscillator, and coming out of the rear mirror 14 is reflected and diffused, and the other beam is converged, passes through the wavelength selection filter 16, and is guided to the light sensor 1. This design allows the real image of the cut point to be provided without the condenser 35 employed in FIG. 10 being used, and the laser light sensor 19 disposed allows the laser output to be detected to have the same effect as in Embodiment 9. The light sensor 1 may be a single light-receiving device like an Si photodiode or a camera like a CCD where light-receiving devices are integrated in an array form. The single device can detect a change in intensity of the emission at the cut point and the camera device can detect a change in intensity distribution or color (wavelength) of the emission from the real image of the cut point in addition to aa change in intensity of the emission at the cut point.

Embodiment 11

Figure 12:
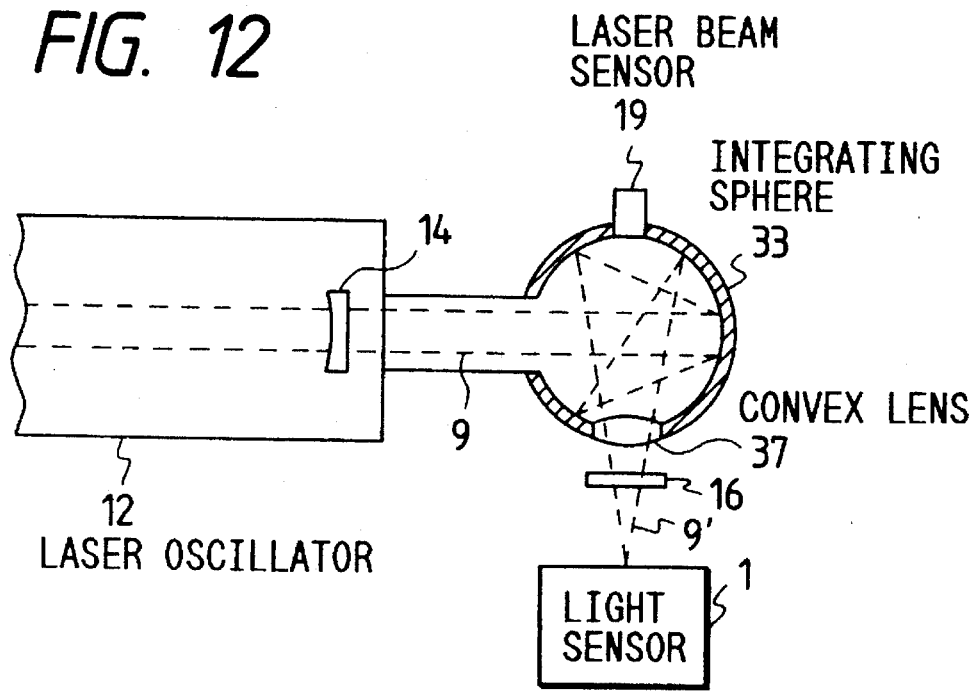
FIG. 12 is an arrangement diagram of a laser cutting machine in an eleventh embodiment of the invention.

FIG. 12 illustrates the laser cutting machine according to an eleventh embodiment wherein the lens 37 shown in Embodiment 10 is disposed in an optional position in the integrating sphere 33. The lens 37 disposed as shown allows the light other than the laser beam to be gathered out of the light generated at the cut point, returning to the laser oscillator, coming out of the rear mirror 14, and diffused and averaged in the integrating sphere 33, whereby more light can be guided to the light sensor 1. Also, the laser light sensor 19 provided allows the laser beam detection for laser output monitoring and the beam detection from the cut point by means of the light sensor 1 to be carried out simultaneously.

Embodiment 12

Figure 13:
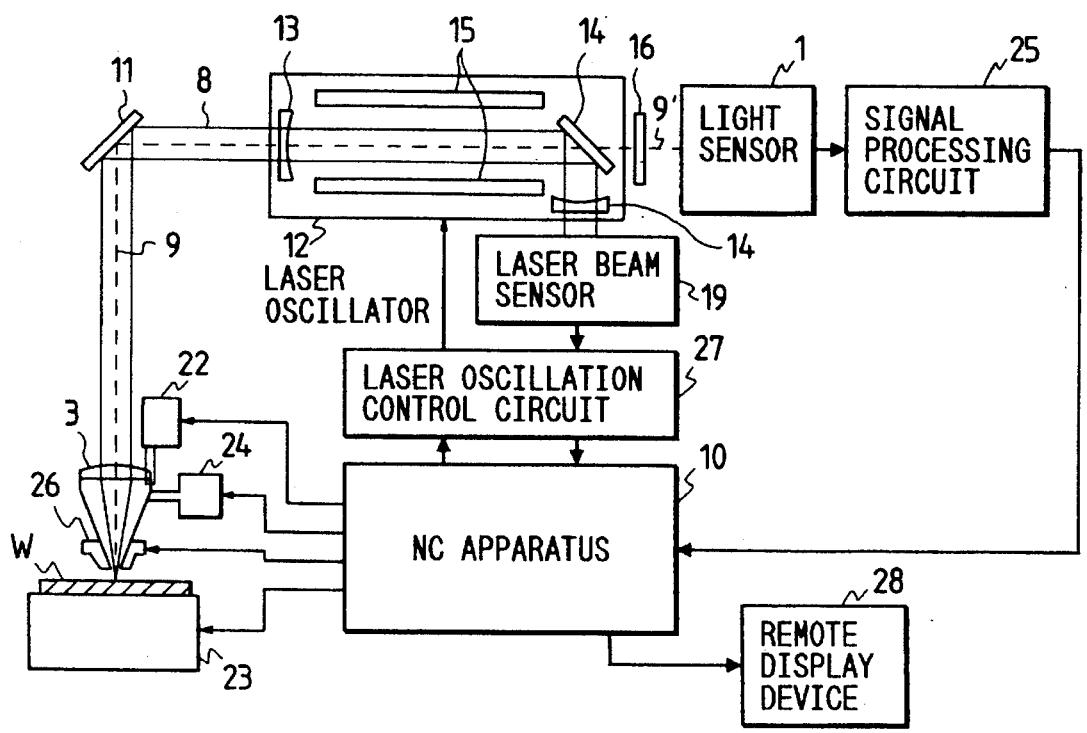
FIG. 13 is an arrangement diagram of a laser cutting machine in a preferred structure for the twelfth embodiment of the invention.

FIG. 13 is an arrangement diagram illustrating a laser cutting machine concerned with a twelfth embodiment of the invention. There, 22 indicates a driving gear which contains a position encoder for moving an optical condenser system, e.g., the cutting lens 3, in a beam axis (vertical) direction and which may drive not only the cutting lens but also the entire cutting head incorporating the cutting lens. 26 denotes a driven nozzle which can change a distance between the workpiece and the nozzle and a nozzle shape. 23 represents a drive table for moving the workpiece W, 24 designates a cutting gas regulator for adjusting a cutting gas state such as the pressure, flow rate, type, components, etc., of cutting gas, 10 indicates an NC apparatus including a servo circuit which controls the driving gear 22, the drive table 23 and the driven nozzle 26 and having a function to generate a command signal to the cutting gas regulator 24 and the laser oscillator 12, and 27 denotes a laser oscillation control circuit for converting an oscillating laser output from the detection signal of the laser light sensor 19 to exercise feedback control to match the laser output with a laser output command value from the NC apparatus 10. 25 indicates a light sensor detection signal processing circuit for finding from a signal the change in cut point emission intensity of the output produced at the cut point and detected by the light sensor 1 in accordance with any of the methods already described in Embodiments 1 to 11. In this regard, the change can be determined via the light guiding path and the laser oscillator 12 in the case that the light sensor 1 is a single device. Alternatively, the change in cut point emission intensity distribution or color (wavelength) may be determined through image processing in the case that the light sensor 1 is a camera device. Processing circuit 25 also may be used for performing peak detection, comparison operation, etc., to generate a signal to the NC apparatus 10. 28 designates a remote display device for alerting an operator who is located away from the laser cutting machine that there is an apparatus fault or the like.

Figure 14:
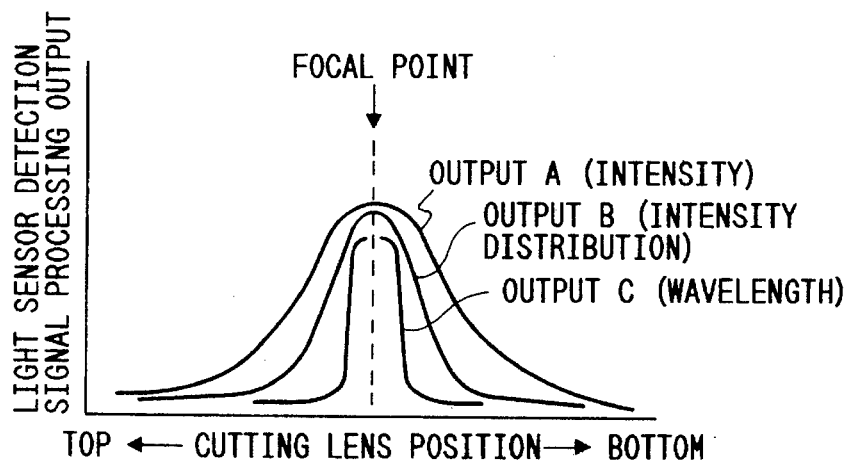
FIG. 14 illustrates a relationship between a cutting lens position and a light sensor detection signal processing output in the machine shown in FIG. 13.

Operation will now be described. While the workpiece W is being moved in a horizontal direction by the drive table 23, the workpiece W is irradiated with a weak laser beam of approximately 100W using inactive cutting gas such as nitrogen. When the cutting lens 3 is moved up and down, emission occurs at the point of irradiation. When the focal point of the cutting lens coincides with the workpiece surface, blue emission (blue flame) of especially high brightness takes place. FIG. 14 shows an example of a light sensor detection signal processing output provided when the emission at the point of irradiation detected by the light sensor 1 has been processed by the light sensor detection signal processing circuit 25. The intensity of the emission at the point of irradiation changes relative to the movement of the cutting lens in the beam axis (vertical) direction. When the light sensor 1 is a single device, the change in emission intensity from the whole point of irradiation is detected, whereby output A is provided. When the light sensor 1 is a camera device, the emission intensity distribution is detected, whereby output B is provided in view of a high brightness point in the intensity distribution and output C is provided in view of the brightness change of the beam wavelength (color) generated at the time of the blue flame. In any of the outputs A, B and C, the position where the output is maximum during the vertical motion of the cutting lens corresponds to a state in which the focal point of the cutting lens matches the workpiece surface. Accordingly, in view of any of the light sensor detection signal processing outputs A, B and C, a focal point detection signal is sent from the light sensor detection signal processing circuit 25 to the NC apparatus 10 when the output is maximum and the then value of the position encoder in the driving gear 22 is stored, whereby the position of the cutting lens where the workpiece surface matches the focal point of the cutting lens is identified to automatically perform focusing work. When the optical condenser system is of a reflection type, e.g., a parabolic mirror, the identical operation can be carried out.

Figure 15A:
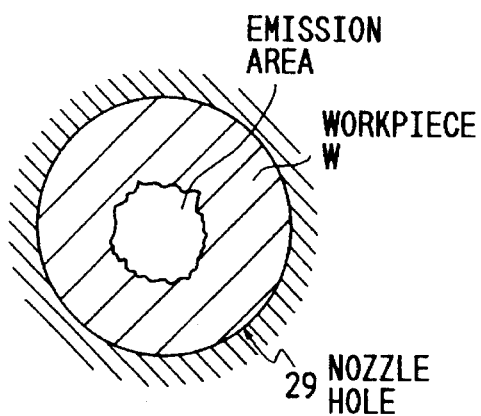
FIG. 15 is a diagrammatic view showing the detection status of a cut point during piercing in the machine shown in FIG. 13.
Figure 15B:
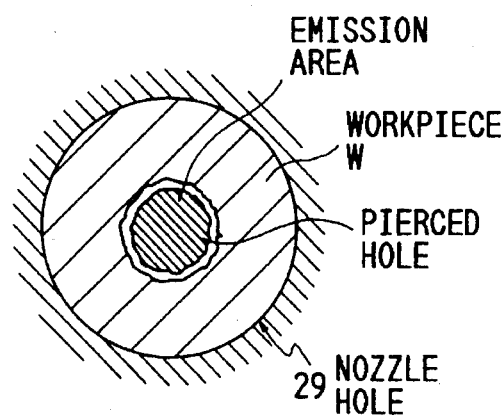
Figure 16:
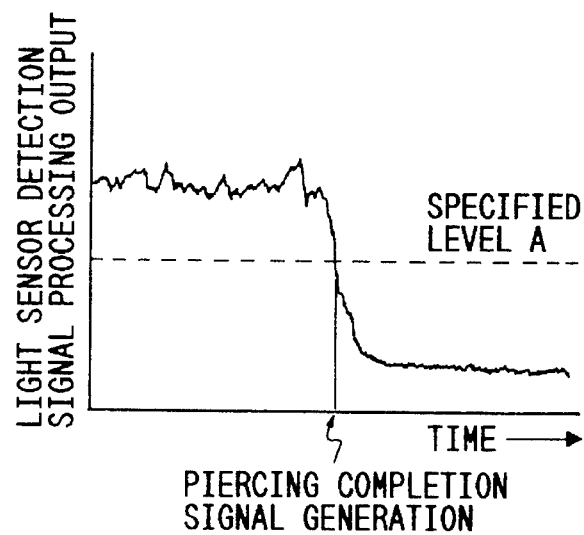
FIG. 16 illustrates the changes of the light sensor detection signal processing output before and after the completion of piercing.
Figure 17:
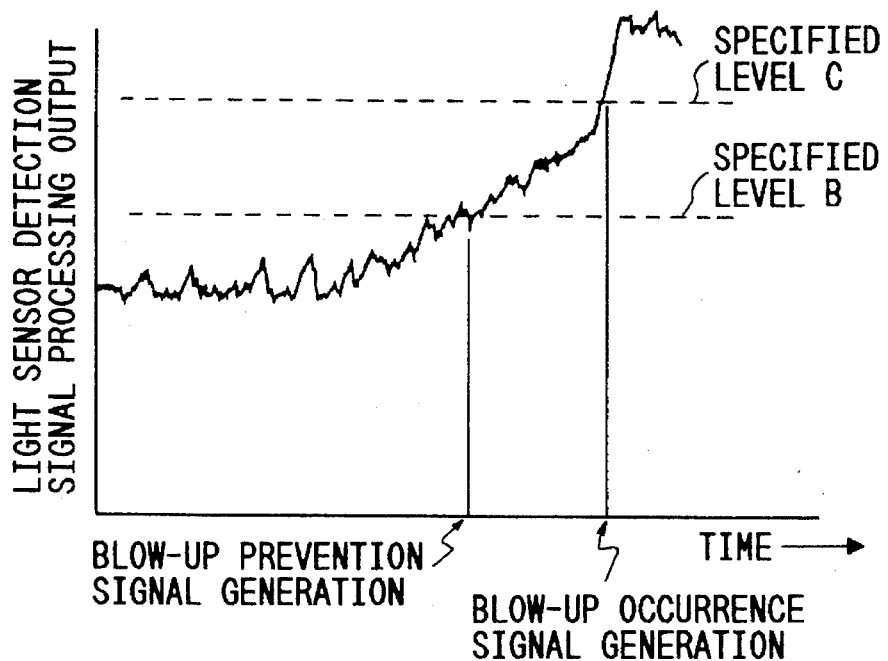
FIG. 17 is a waveform diagram of the light sensor detection signal processing output at a time when blow-up has occurred during piercing.

FIG. 15a and 15b are diagrammatic views illustrating an example of the state of a cut point pierced at a laser cutting starting point, detected by the light sensor 1 of the camera device, and image-processed by the light sensor detection signal processing circuit 25. At the cut point observed through a nozzle hole 29, the whole cut point emits light as in (a) before the completion of piercing, but only the outer edge of the pieced hole emits light as in (b) after the completion of piercing. FIG. 16 shows an example of the light sensor detection signal processing output provided when the light generated from the cut point during piercing is detected by the light sensor 1 and processed by the light sensor detection signal processing circuit 25. Whether the light sensor 1 is a single device or a camera device, the output is similar. Since light intensity reduces after the completion of piercing, the output level decreases. The completion of piercing can be detected by determining that the output level has fallen below a predetermined specified level A, which has been identified empirically as indicating the completion of piercing. Hence, if the light sensor detection signal processing output corresponding to the intensity of light at the cut point is compared with the specified level A by a comparison circuit provided in the light sensor detection signal processing circuit 25, a piercing completion signal is sent from the light sensor detection signal processing circuit 25 to the NC apparatus 10 when the output has dropped below the specified level A. Further, if the NC apparatus 10 starts next operation on receipt of that signal, the workpiece can be cut sequentially, without piercing time changing due to the initial temperature, etc., of the workpiece being preset, and cutting time can be shortened. Also, since temperature in the periphery of the irradiation point rises immediately before blow-up takes place during piercing, the emission area expands due to heat radiation and the intensity of light emitted from the cut point and detected by the light sensor 1 increases. FIG. 17 shows an example of the above state. Since the light sensor detection signal processing output rises in response to the increase in light intensity, a specified level B is predetermined as a threshold value of blow-up occurrence. If the light sensor detection signal processing output is compared with the specified level B, a blow-up prevention signal is sent from the light sensor detection signal processing circuit 25 to the NC apparatus 10 when the output has exceeded the specified level B, and the NC apparatus 10 starts controlling the oscillation condition of the laser oscillator, such as the output, frequency and duty, or the cutting gas pressure immediately after receipt of the signal, the failure of piercing due to blow-up can be prevented. Also, if a specified level C corresponding to the light sensor detection signal processing output level at the occurrence of blow-up is set, blow-up that occurred because the piercing failure could not be avoided in the above method can be detected, and if its information is sent to the NC apparatus 10, operation can be stopped and the operator can be alerted to the fault through the remote display device 28.

As described above, when the cut point can be observed from the top, the intensity of emission at the cut point is made clear and an S/N ratio improves, whereby blue flame occurrence, piercing completion and a sign of blow-up occurrence can be detected accurately and signal processing for focal point detection, piercing completion detection and blow-up prevention can be performed easily as compared to the conventional apparatus.

Figure 18:
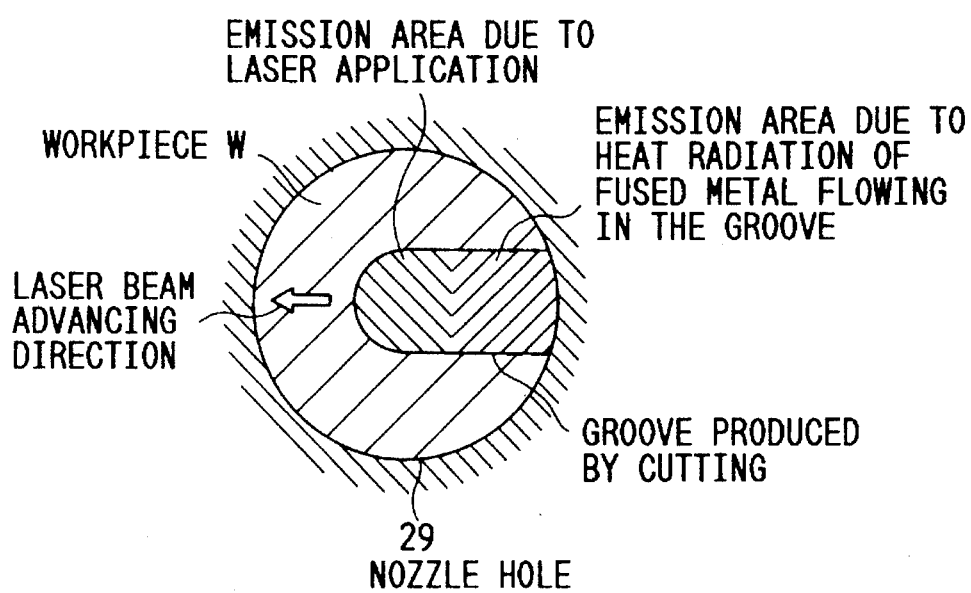
FIG. 18 is a diagrammatic view showing the detection status of a cut point during cutting.

FIG. 18 is a diagrammatic view illustrating an example of the state of a cut point during laser cutting which has been detected by the light sensor 1 of the camera device and of which detection output has been image-processed by the light sensor detection signal processing circuit 25. In addition to the emission at the laser irradiation point, a groove produced by cutting is observed on the opposite side of the laser beam advancing direction and emission due to the heat radiation of fused metal flowing down in the groove is also observed. When the cutting state changes during cutting, the emission state of the cut point changes.

Figure 19:
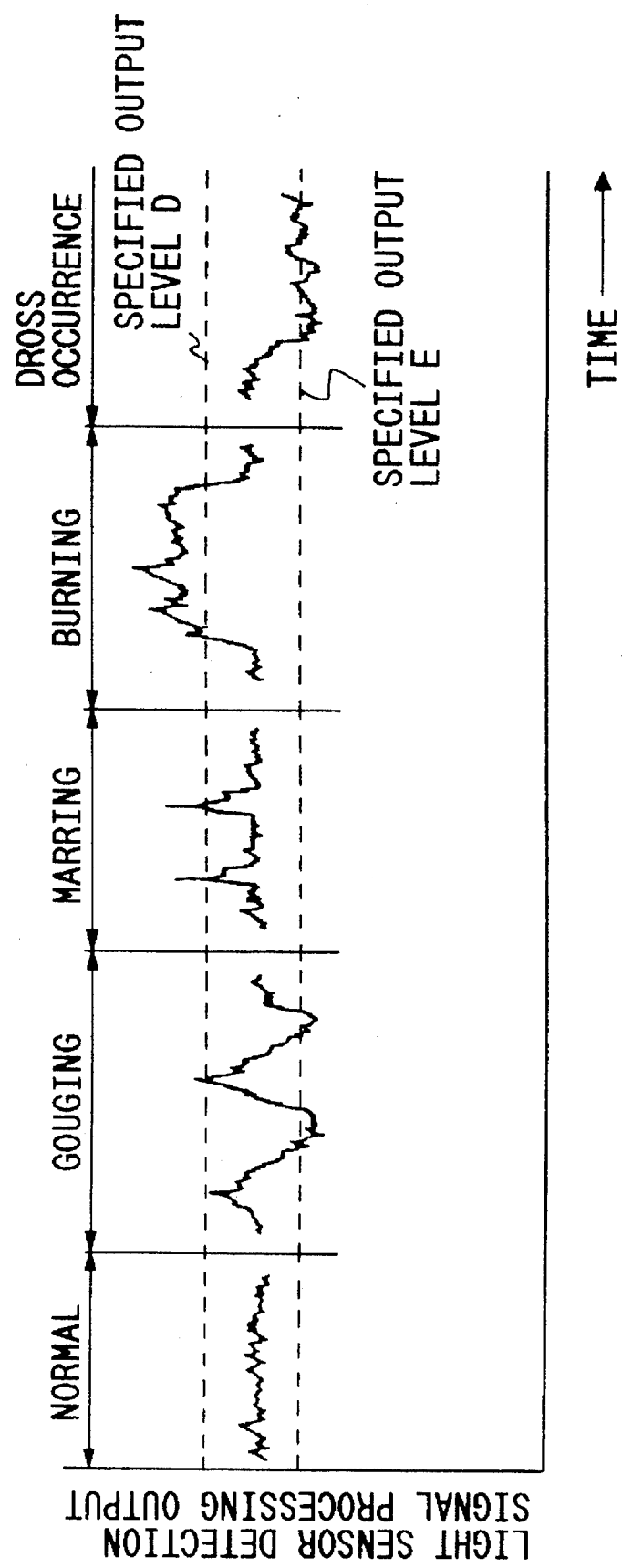
FIG. 19 is a waveform diagram of the light sensor detection signal processing output at a time when a cutting fault has occurred during cutting.

FIG. 19 shows an example of light sensor detection signal processing output provided when a cutting fault, such as gouging, cut surface marring, burning or dross occurrence, takes place. Whether the light sensor 1 is a single device or a camera device, the output is similar. When such cutting fault occurs, the emission intensity of the cut point varies irregularly as compared to the normal state, and the light sensor detection signal processing output also varies correspondingly. Hence, if the light sensor detection signal processing is compared with predetermined specified levels D and E and any change to the outside of a range between such specified levels D and E is detected, cutting fault occurrence can be identified. If that information is sent to the NC apparatus 10, the operator can be alerted to the cutting fault occurrence through the remote display device 28. Also, generally, if said cutting fault occurs during cutting, the appropriate adjustment of the oscillation condition such as the beam mode, output, frequency and duty, the cutting gas pressure, the flow rate, the type, the focal position, the feedrate, the nozzle height, the nozzle shape, etc., allows the cutting to be restored to a proper state and the cutting fault to be improved. Therefore, if adjustment items of the oscillation condition such as the beam mode, output, frequency and duty, the cutting gas pressure, the flow rate, the type, the focal position, the feedrate, the nozzle height, the nozzle shape, etc., are stored beforehand in the NC apparatus 10 according to the occurrence status of such cutting fault and the adjustment items are adjusted under the command of the NC apparatus 10 concurrently with the detection of the cut point state by the light sensor 1, the cutting fault can be improved automatically.

Figure 20:
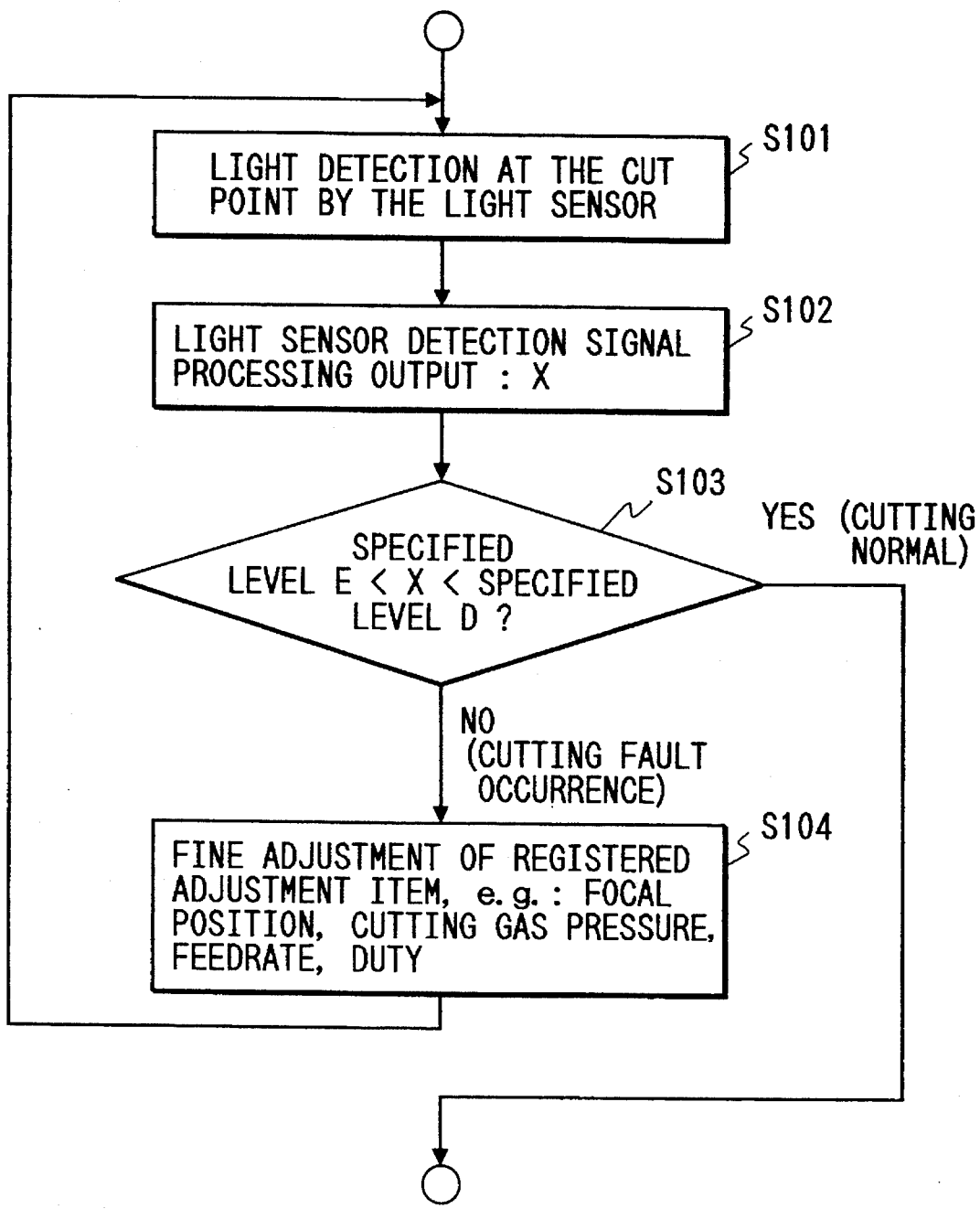
FIG. 20 is an automatic cutting fault improvement processing flowchart.

FIG. 20 is a flowchart for the processing of the automatic cutting fault improvement. When the light sensor 1 is a camera device and its output is image-processed by the light sensor output signal processing circuit 25, the change in emission intensity distribution at the cut point can be identified. Hence, the cutting condition can be monitored in more detail than in the detection of the change in light intensity. Also, since temperature distribution, etc., at the cut point can be identified, processing other than cutting, such as hardening and welding, can be automated in a similar manner.

When the beam produced at the cut point and returning to the laser oscillator is detected by the light sensor (step S101), the resulting detection output is signal-processed (step S102). If the light falls within certain upper and lower specified levels (D and E, respectively), normal cutting is conducted; however, if the levels are breached, the occurrence of a cutting fault is determined (step S103). From the above example, it can be seen that if the laser cutting machine is controlled according to the result of such processing as described above, focusing, piercing completion detection, blow-up detection, cutting fault detection and cutting fault improvement can be carried out, cutting automated, and unmanned operation performed (step S104).

Embodiment 13

Figure 21:
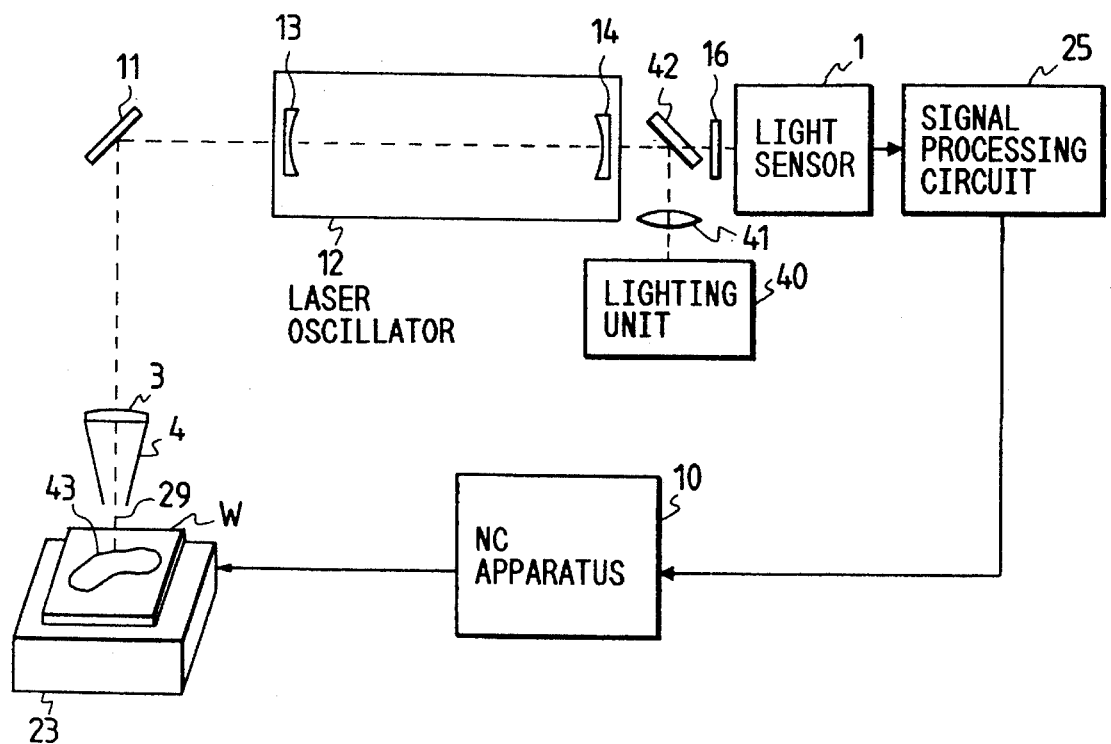
FIG. 21 is an arrangement diagram of a laser cutting machine in a preferred form of a thirteenth embodiment.
Figure 22:
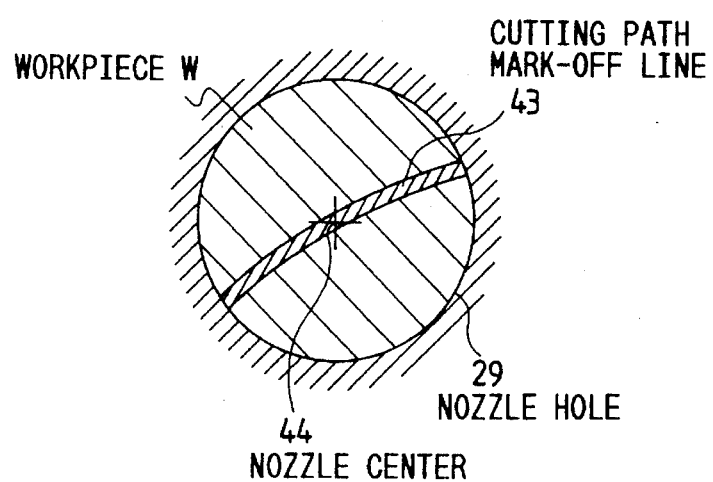
FIG. 22 is a diagrammatic view showing the detection status of a cut surface in cutting path mark-off line detection operation in the laser cutting machine of the thirteenth invention.

FIG. 21 is an arrangement diagram showing a laser cutting machine according to a thirteenth embodiment of the invention, wherein 40 indicates a lighting unit of which light generated is made parallel by a lens 41, introduced into the laser oscillator 12 by a beam splitter 42, passes the laser oscillator 12, the light guiding path, the cutting lens 3 and the nozzle hole 29, and illuminates the cut surface of the workpiece W. The cut surface illuminated by the light of the lighting unit 40 is detected through the nozzle hole 29 by the light sensor using the camera device in any of the methods in Embodiments 1 to 5 and 8 to 10 and its output is image-processed by the light sensor detection signal processing circuit 25 to detect a cutting path mark-off line 43 equivalent to a preprovided cutting path on the surface of the workpiece W. FIG. 22 shows an example of the above cut. There, a nozzle center 44 relative to the nozzle hole 29 is found from the image and a drive command is sent from the NC apparatus 10 to the drive table 23 so that the nozzle center 44 is located on said cutting path mark-off line 43 to enable copy operation and positioning along the cutting path mark-off line 43, whereby a shape can be cut without a shape program with a written cutting path being input to the NC apparatus.

The detection of the cutting path mark-off line 43 provided on the surface of the workpiece W and the copy operation may be performed while simultaneously the workpiece W is being irradiated with the laser beam and cut, or teaching may be carried out first only by the copy operation and the workpiece cut subsequently on the basis of the generated teaching data.

Further, when the drive table 23 used is a three-dimensional cutting table having a rotary shaft in addition to a horizontal travel, the copy operation of the cutting path mark-off line 43 preprovided on a three-dimensional solid body can be performed and teaching work which had been done manually is automated, reducing the work time sharply. It will be recognized that the bend mirror 11 in the light guiding path may employed as a beam splitter for reflecting the laser beam and passing the other beam and the lighting unit 40 disposed in that position to illuminate the workpiece W, thereby producing the identical effect. Also in Embodiment 12, the lighting unit may be added to light up the cut point during cutting for detection.

Embodiment 14

Figure 23:
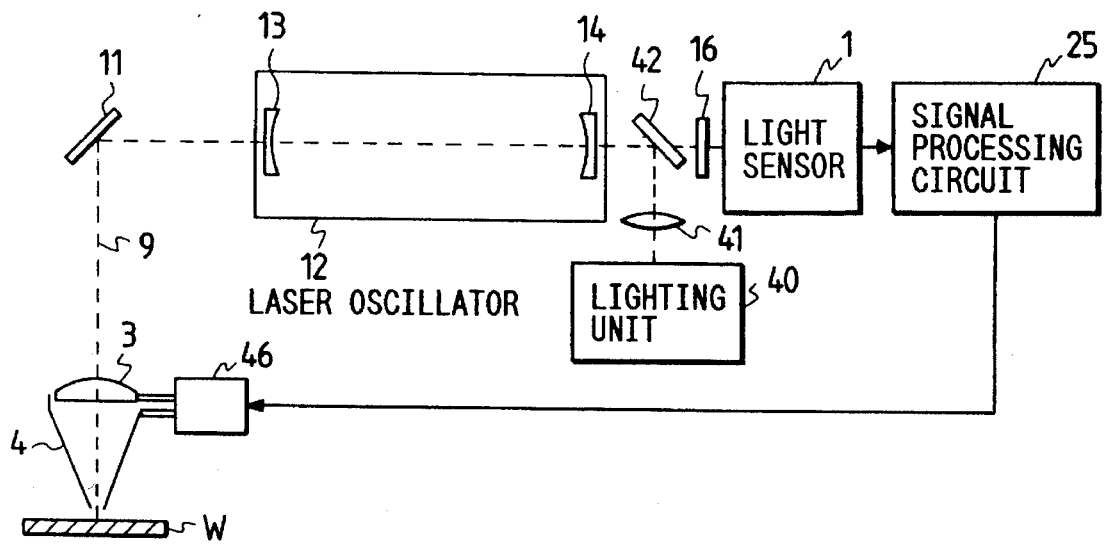
FIG. 23 is an arrangement diagram of a laser cutting machine in a preferred embodiment of a fourteenth invention.
Figure 24:
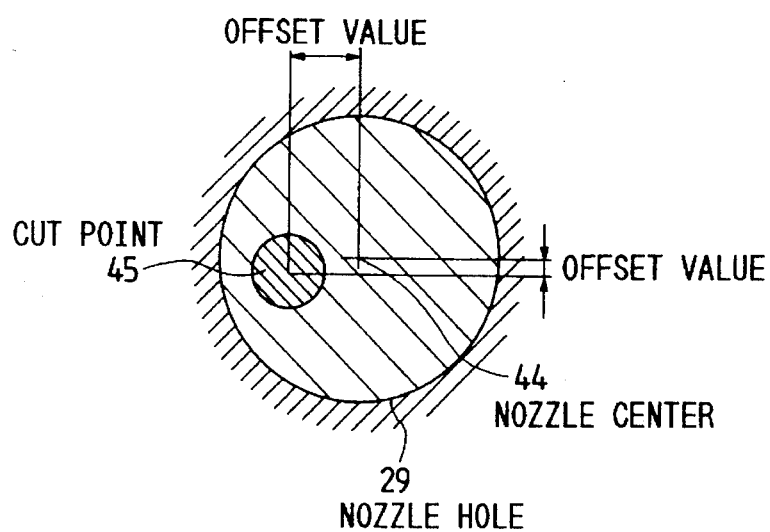
FIG. 24 is a diagrammatic view showing the detection status of a cut surface in misalignment compensation operation in the laser cutting machine of the fourteenth invention.

FIG. 23 is an arrangement diagram showing a laser cutting machine according to a further embodiment of the invention, wherein the cut surface is illuminated by a workpiece W lighting mechanism similar to the one in Embodiment 13 and detected by the light sensor 1 of the camera device in any of the detection methods in Embodiments 1–10, and its output image-processed by the light sensor detection signal processing circuit 25 to identify the relationship between the nozzle hole 29 and the position of a cut point 45 irradiated by the laser beam. FIG. 24 shows an example of the above. The nozzle center 44 relative to the nozzle hold 29 is found from the image, the offset value of said cut point 45 relative to the nozzle center 44 is detected, a compensation value for the correction of that offset value is input to a misalignment compensator 46, and the nozzle 4 or the cutting lens 3 is moved to match the nozzle center 44 with the cut point 45, whereby compensation for the misalignment of the nozzle and cutting lens relative to the laser beam, which had been made manually, can be performed automatically in a short time. Also, since the whole nozzle hole is observed, the deformation and clogging of the nozzle hole can be detected.

Embodiment 15

Figure 25:
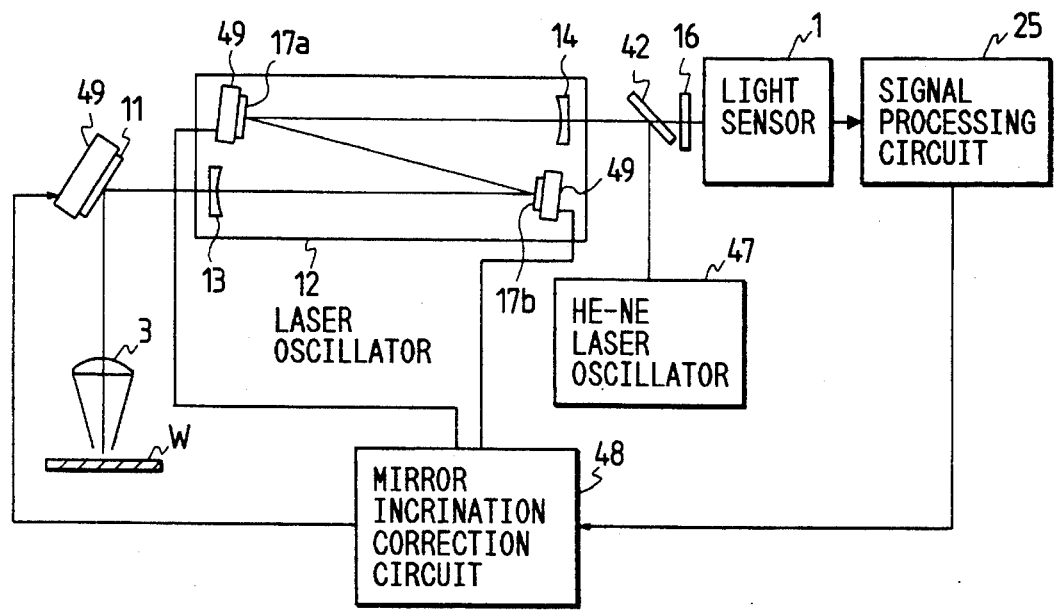
FIG. 25 is an arrangement diagram of a laser cutting machine in a preferred embodiment of a fifteenth invention.

FIG. 25 is an arrangement diagram showing a laser cutting machine according to a fifteenth embodiment of the invention, wherein 47 indicates a laser oscillator for generating a visible laser beam such as HeNe (helium neon) laser. The HeNe laser beam oscillated is reflected by the beam splitter 42, is introduced into the laser oscillator 12 coaxially with the laser output beam, and further is applied to the workpiece W via the beam guiding path. The HeNe laser beam applied is reflected on the workpiece W surface, passes through the light guiding path again, returns into the laser oscillator 12, further passes through the rear mirror 14 in the laser oscillator and the beam splitter 42, and is introduced to the light sensor 1. This return light is detected by the light sensor 1 of the camera device in any of the detection methods in Embodiments 1–10, and its output is image-processed by the light sensor detection signal processing circuit 25 to provide information on the offset of the beam axis due to the inclinations of the bend mirror 11 in the light guiding path and the resonator mirrors 17a, 17b, etc. The correction of the inclinations of the bend mirror 11 in the light guiding path and the resonator mirrors 17a, 17b, etc., on the basis of such information allows the offset of the beam axis to be corrected. Also, the information on the offset of the beam axis output from the light sensor detection signal processing circuit 25 is input to a mirror inclination correction circuit 48 and a correction value command is sent from said mirror inclination correction circuit 48 to a mirror inclination correction 49 which power-corrects the inclinations of the mirror provided for the bend mirror 11 in the light guiding path and the resonator mirrors 17a, 17b, etc., to automatically compensate for the offset of the beam axis due to the inclinations of the mirrors.

Embodiment 16

Figure 26:
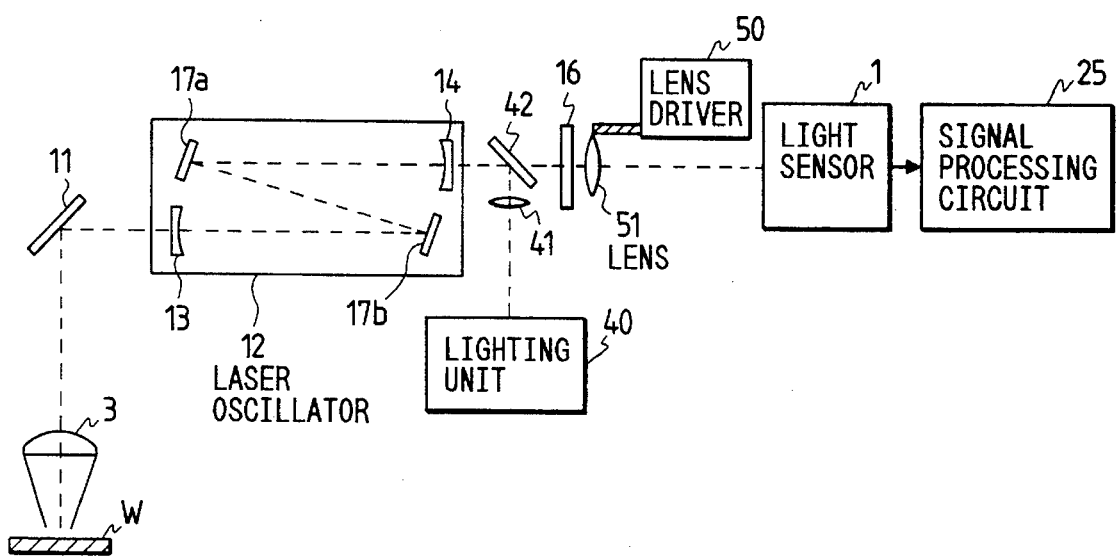
FIG. 26 is an arrangement diagram of a laser cutting machine in a preferred embodiment of a sixteenth invention.

FIG. 26 is an arrangement diagram showing a laser cutting machine according to another embodiment of the invention, wherein 51 indicates a condenser which is placed immediately before the light sensor 1 in any of the methods in Embodiments 1 to 5 and 8 to 10 and can be moved in the beam axis direction by a lens driving gear 50 to change a focus distance. By disposing a lighting mechanism similar to the one in Embodiment 13, the beam reflected by the illuminated object and coming out of the rear mirror 14 in the laser oscillator passes through the condenser 51 and is introduced to the light sensor 1 of the camera device. By moving the condenser 51 by means of the lens driving gear 50, the focal position is changed as appropriate from the surface of he workpiece W to the cutting lens 3, the bend mirror 11 and the resonator mirrors 13, 17a, 17b in the laser oscillator, whereby the states of said surfaces can be observed by the light sensor 1. By image-processing its output by the light sensor detection signal processing circuit 25, the contamination and damage of the optical parts such as the cutting lens, the bend mirror and the resonator mirrors can be detected, whereby the laser cutting machine can have a self-diagnostic function. It will also be recognized that the focus moving function by means of the condenser 51 and the lens driving gear 50 shown in FIG. 24 may be employed in Embodiments 12 to 15.

Embodiment 17

Figure 27:
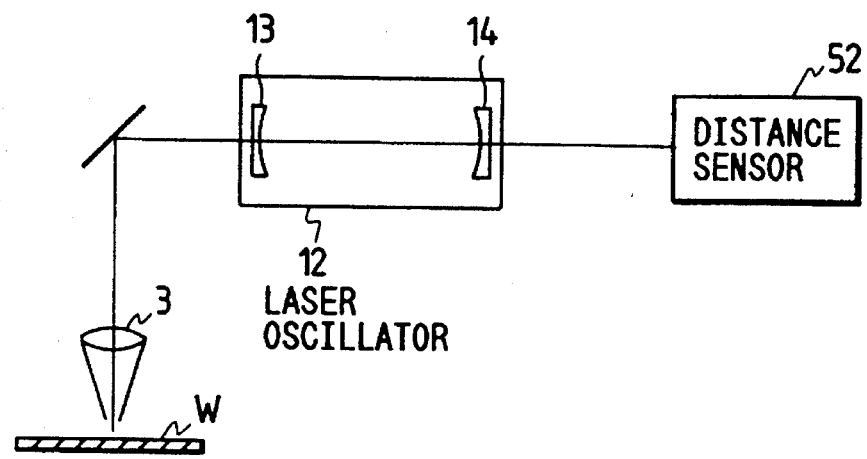
FIG. 27 is an arrangement diagram of a laser cutting machine in a preferred embodiment of a seventeenth invention.
Figure 29:
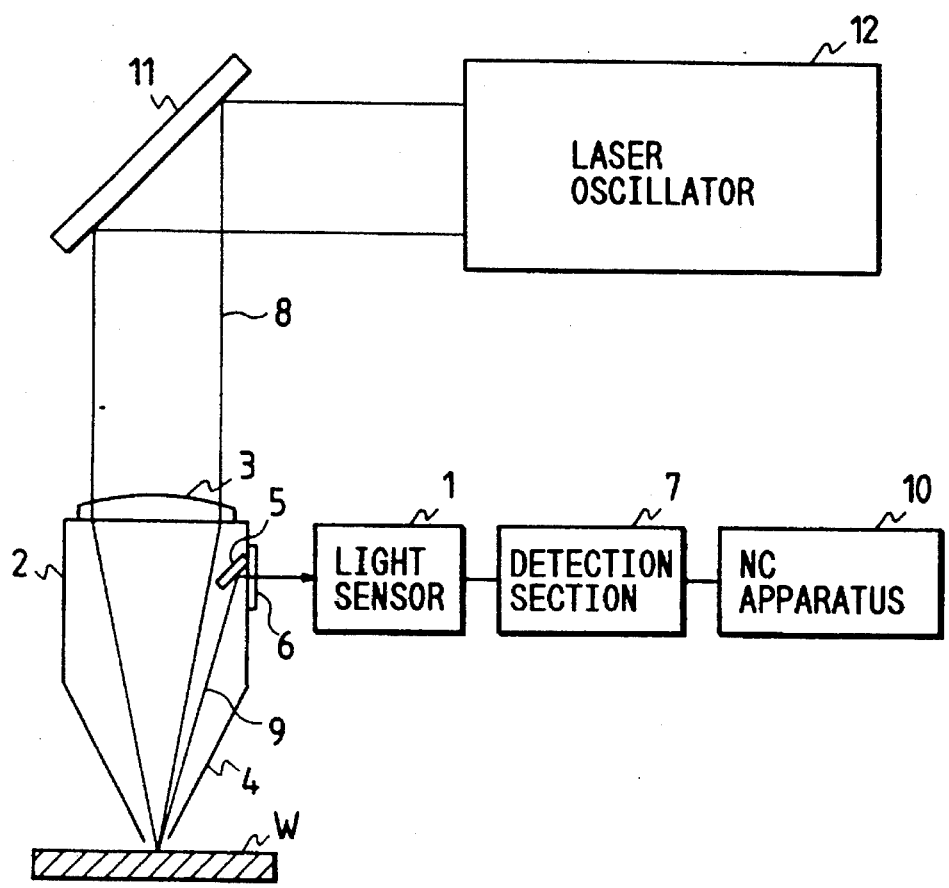
FIG. 29 illustrates a laser cutting machine known in the conventional art.

FIG. 27 is an arrangement diagram showing a laser cutting machine according to an embodiment of a seventeenth invention, wherein 52 indicates a distance sensor constituted by a sensor integrated with a generator of laser, supersound, infrared rays or the like for measuring a distance from behind the rear mirror 14 up to the workpiece surface via the laser oscillator and the light guiding path. This allows the distance from the cutting lens to the workpiece surface to be detected precisely at high speed and the focal position of the cutting lens 3 due to the uneven surface of the workpiece and the change of thickness to follow the workpiece surface accurately during cutting, ensuring accurate and stable cutting.

Embodiment 18

Figure 28A:
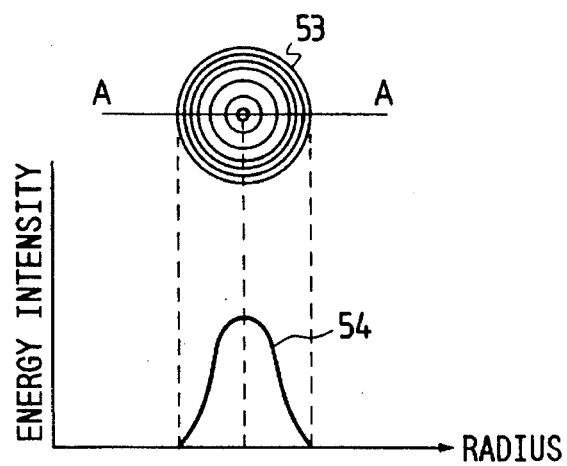
FIG. 28(a) shows the brightness distribution of the light generated by the cut surface by the application of the beam in a preferred embodiment of an eighteenth invention.
Figure 28B:
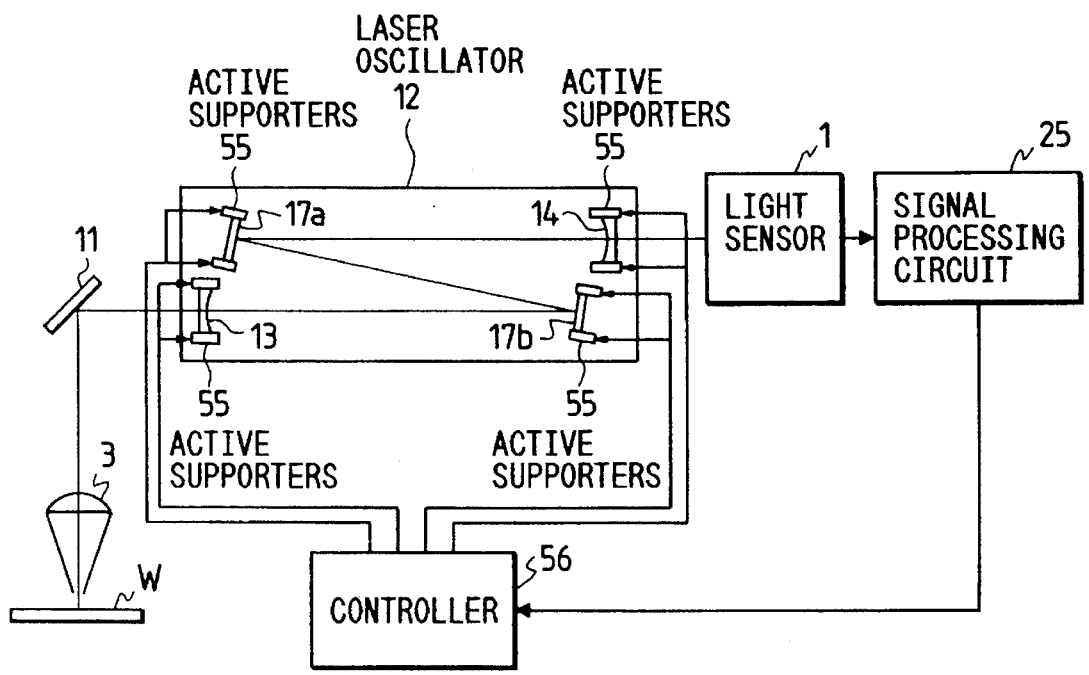
FIG. 28(b) is an arrangement diagram of a laser cutting machine in a preferred embodiment of the eighteenth invention.

FIG. 28(b) is an arrangement diagram showing a laser cutting machine according to a final embodiment of the invention, wherein in FIG. 28(a) element 53 indicates brightness distribution of the light generated on the cut surface by the application of the laser beam of proper output to the cut surface. The brightness distribution 53 is detected by the light sensor 1 of the camera device in any of the methods in Embodiments 1–10 and its output is image-processed by the light sensor detection signal processing circuit 25. The brightness distribution 53 almost corresponds to energy intensity distribution 54 of the leaser beam cross section at the cut surface. Accordingly, the beam mode can be judged from the energy intensity distribution of the laser beam provided as described above. While the brightness distribution 53 transmitted to the NC apparatus 10 and displayed thereon is being checked, the resonator mirrors of the laser oscillator 12 are aligned to maintain the optimum beam mode. Alternatively, alignment may be made using active supporters 55 constituted by a plurality of actuators fitted on the resonator mirrors 13, 17a, 17b, 14 for the fine adjustment of the resonator mirror angles and a controller 56 thereof to maintain the optimum beam mode.

In the meantime, the above embodiments described for the laser cutting machine are not limited thereto and may be applied to any apparatus for causing a laser beam to impinge on an object to be irradiated to produce the identical effects.

Since the present invention is constructed as described above, the following effects are produced.

The beam of wavelength other than the wavelength of the laser beam produced at the cut point on the workpiece and returning into the laser oscillator is obtained from the rear mirror of the resonator for laser resonance or any other resonator mirror to the outside of the resonator and the obtained beam is detected by the light sensor, whereby the light sensor and the mirror need not be disposed adjacent to the cutting head and do not interfere with operation. Also, the sensor, mirror or lens constituting the detection system are prevented from being contaminated by spatter or fume or from being heated by the strong laser beam for cutting, resulting in longer life. Also, since the cut area can be seen from the top, a sufficient light volume can be provided, detection sensitivity is high and a large amount of information is given. Further, the sensor mechanism need not be provided for all the cutting heads exchanged according to cutting, whereby the price of the apparatus is reduced.

Also, the beam splitter for passing the laser beam and reflecting the other beam is disposed between any of the plurality of resonator mirrors for laser resonance, the beam of wavelength other than the wavelength of the laser beam returning into the laser oscillator is obtained outside of the resonator, and the beam is detected by the light sensor, whereby the sensor unit can be disposed inside the laser oscillator to reduce the whole apparatus in size.

Also, the beam-through mirror having a center hole large enough to pass the laser beam is disposed between any of the plurality of resonator mirrors for laser resonance, the beam of wavelength other than the wavelength of the laser beam returning into the laser oscillator is obtained outside of the resonator, and the beam is detected by the light sensor, whereby the return beam can be detected without the intensity and mode of the laser beam being affected adversely, and the sensor unit can be disposed inside the laser oscillator to reduce the whole apparatus in size.

Also, in addition to the above design, when part of the laser beam generated in the laser oscillator is obtained from the rear mirror of the resonator for laser resonance and the laser light sensor for detecting the fetched laser beam is provided, the laser output can also be monitored.

Also, the beam of wavelength other than the wavelength of the laser beam returning into the laser oscillator and part of the laser beam generated in the laser oscillator are obtained from the rear mirror of the resonator for laser resonance to the outside of the resonator, and the integrating sphere for diffusing and extincting said beams uniformly, the laser light sensor for detecting the extincted laser beam, and the light sensor for detecting the beam other than the laser beam are provided, whereby the monitoring of the laser output and the detection of the return beam from the cut point can be carried out at the same time and the machine can be reduced in price and size.

Also, the beam splitter for separating the laser beam component and the other beam out of the beam transmitted into the integrating sphere is disposed, the laser light sensor is installed to detect the laser beam separated by the beam splitter and subsequently diffused and extincted in the integrating sphere, and the light sensor is installed to detect the beam other than the laser beam separated by the beam splitter, whereby the beam other than the laser beam can be guided to the light sensor efficiently without the uniformity of the laser beam in the integrating sphere being disturbed, and the real image at the cut point can be viewed.

Also, the beam splitter designed to reflect and diffuse on its inner surface the laser beam component out of the beam transmitted into the integrating sphere and to pass the other beam is disposed on the inner surface of the integrating sphere, the light sensor is installed to detect the beam passing through said beam splitter, and the laser light sensor is installed to detect the laser beam diffused and processed in the integrating sphere, whereby the same effects as in the previous designs can be produced.

Also, when the light sensor is designed to detect the change in intensity, intensity distribution or wavelength of the beam at the cut point to detect the focal position, the focusing of the optical condenser system relative to the workpiece can be performed accurately and easily.

Also, when the light sensor is designed to detect the change in intensity, intensity distribution or wavelength of the beam at the cut point to detect the completion and fault of piercing at the cutting starting point, the cutting time can be reduced.

Also, when the light sensor is designed to detect the change in intensity, intensity distribution or wavelength of the beam at the cut point to detect the cutting status of laser cutting such as cutting, welding and hardening, the occurrence of a cutting fault can be prevented.

Also, at least one of the circuit for detecting the focal position on the basis of the change in intensity, intensity distribution or wavelength of the beam detected by the light sensor, the circuit for detecting the completion of piercing or a fault during piercing on the basis of the same, and the circuit for detecting the cutting condition on the basis of the same is provided and the least one of the laser oscillator oscillation condition, the cutting gas state, the focal position, the feedrate and the nozzle state is controlled under the control of the signal of said circuit, whereby the cutting can be automated and unattended operation achieved.

Also, the cut surface is illuminated from behind the rear mirror in the laser oscillator via the light guiding path, its reflected light is detected by the light sensor behind the laser oscillator, and its image is processed, whereby information on the cutting path preprovided on the workpiece can be read, copy operation performed along that path, and shape cutting done without a cutting shape program being input beforehand.

Also, the circuit for detecting the beam axis offset of the laser beam on the basis of the positional relationship of the beam detected by the light sensor with the nozzle hole in the front end of the cutting head and the compensator means for compensating for the misalignment of the nozzle and the optical condenser system relative to the laser beam under the control of the signal of said circuit are disposed to automatically adjust the position of the laser beam axis relative to the nozzle hole in the cutting head.

Also, the visible laser beam is applied from behind the rear mirror in the laser oscillator and the position of said visible laser beam reflected by the workpiece is detected, whereby the beam axis offset due to the inclinations of the light guiding path mirror and the resonator mirrors can be detected to automatically adjust the inclinations of the light guiding path mirror and the resonator mirrors.

Also, the condenser having a variable focal point, the light sensor and the wavelength selection filter are disposed behind the rear mirror in the laser oscillator, whereby the contamination and damage of the optical parts such as the cutting lens and the bend mirror in the light guiding path and the resonator mirrors can be detected and the apparatus can be self-diagnosed.

Also, the non-contact type distance sensor is provided behind the rear mirror in the laser oscillator and the distance up to the cut surface is measured, whereby the distance between the cutting lens and the workpiece surface can be adjusted to always offer the highest cutting performance, improving the cutting performance.

Further, the brightness distribution of the laser beam applied to the cut surface is detected by the light sensor disposed behind the rear mirror in the laser oscillator, whereby the mode of the laser beam can be detected to control and maintain high beam quality.

What is claimed is:

1. A laser machining apparatus having an optical system for shaping a laser beam generated by a laser oscillator for irradiation onto a workpiece and machining the workpiece with the laser beam at machining points, said machining resulting in the generation at a machining point of a secondary light, the laser oscillator having a resonator comprising a plurality of mirrors, comprising:

first means for directing said secondary light into said resonator for application to at least one of said mirrors;

secondary light directing means for directing said secondary light from a position inside said resonator to a location outside of said resonator; and a secondary light sensor for detecting said secondary light directed by said second directing means.

2. A laser machining apparatus as set forth in claim 1, further comprising:

laser beam directing means for directing at least a part of said laser beam generated in said laser oscillator from a position inside of said resonator to a location outside of said resonator; and a laser light sensor for detecting the laser beam directed by said laser beam directing means.

3. A laser machining apparatus as set forth in claim 1, wherein said secondary light directing means comprises at least one of said plurality of mirrors which is operative for at least one of (i) passing said laser beam and reflecting said secondary light and (ii) passing said secondary light and reflecting said laser beam.

4. A laser machining apparatus as set forth in claim 2, wherein said secondary light directing means comprises a beam splitter for at least one of (i) passing said laser beam and reflecting said secondary light and (ii) passing said secondary light and reflecting said laser beam.

5. A laser machining apparatus as set forth in claim 1, wherein said secondary light directing means comprises a beam through mirror having a hole for at least one of (i) passing said laser beam and reflecting said secondary light and (ii) passing said secondary light and reflecting said laser beam.

6. A laser machining apparatus as set forth in claim 2, wherein said secondary light directing means and said laser beam directing means comprises at least a common mirror and said apparatus further comprises:

an integrating sphere, having an inner surface, for uniformly diffusing and processing at least one of said part of the laser beam and said secondary light passed to the outside of said oscillator;

at least one of said laser light sensor and said secondary light sensor being operative to detect at least one of said laser beam and said secondary light, respectively, after processing by said integrating sphere.

7. The laser machining apparatus as defined in claim 6, further comprising a beam splitter disposed in the integrating sphere for separating said laser beam and said secondary light.

8. The laser machining apparatus as defined in claim 6, further comprising a beam splitter constituting part of the integrating sphere for causing at least part of the laser beam transmitted to the inside of the integrating sphere to be reflected and diffused by the inner surface thereof, and the secondary light to pass through said sphere.

9. The laser machining apparatus as defined in claim 1, further comprising means for determining the focal position of said optical system on the basis of at least one of changes in intensity, intensity distribution and wavelength of the light detected by said secondary light sensor.

10. The laser machining apparatus as defined in claim 1, further comprising means for determining at least one of piercing completion and a fault during piercing on the basis of at least one of changes in intensity, intensity distribution and wavelength of the light detected by said secondary light sensor.

11. The laser machining apparatus as defined in claim 1, further comprising detector means for detecting a cutting status on the basis of at least one of changes in intensity, intensity distribution and wavelength of the light detected by said secondary light sensor.

12. The laser machining apparatus as defined in claim 1, wherein said secondary light directing means comprises a rear mirror of said resonator.

13. The laser machining apparatus as defined in claim 1, further comprising a lighting unit for generating a light coaxially with the laser beam, a beam splitter for separating the reflected light of said beam generated by said lighting unit and reflected from the machined surface of the workpiece and said secondary light, detector means for detecting the machined surface in response to said secondary light sensor, and control means responsive to said detector means for exercising copy control along said machining path.

14. The laser cutting machine as defined in claim 1, wherein said apparatus comprises a cutting head with a nozzle hole and a front end, and further comprises detector means for detecting the beam axis offset of the laser beam according to the positional relationship between the beam detected by said secondary light sensor and said nozzle hole and said front end of said cutting head, and compensator means for compensating for the misalignment of said nozzle hole and said optical system relative to said laser beam in response to said detector means.

15. The laser machining apparatus as defined in claim 12, further comprising a visible laser oscillator for generating a visible laser beam from behind said rear mirror coaxially with the laser beam, a beam splitter for separating said visible laser beam reflected by the machined surface of the workpiece and returned into said laser oscillator and the secondary light, detector means responsive to said visible laser beam received by the laser light sensor for detecting at least one of a beam axis offset, inclinations of said resonator mirrors or a light guiding path mirror for guiding the laser beam to the workpiece, and compensator means for changing the inclination of said mirrors in response to said detector means to compensate for the beam axis offset.

16. The laser machining apparatus as defined in claim 1, further comprising a condenser for shaping the secondary light for detection by said secondary light sensor, and drive means for moving said condenser in a beam axis direction to provide a variable focus.

17. The laser machining apparatus as defined in claim 12, further comprising a distance sensor, disposed behind said rear mirror of the resonator, for detecting a distance up to a machined surface, and a driving gear for driving an optical condenser element for gathering the laser beam in the beam axis direction according to the distance detected by said distance sensor.

18. The laser machining apparatus as defined in claim 1, further comprising detector means for detecting the beam mode of the laser beam according to the detection signal of the secondary light sensor, active supporting mechanisms for adjusting the angles of the resonator mirrors, and control means for controlling said active supporting mechanisms according to the result of detection by said detector means to provide beam mode compensation.

19. A laser machining method for use in laser machining comprising the steps of:

generating a laser beam within a laser oscillator and directing said beam onto a workpiece surface for machining, said machining generating a secondary light;

receiving said secondary light within said laser oscillator;

directing said secondary light from within said oscillator to a location outside of said laser oscillator;

separating said secondary light from said laser beam after said laser oscillator has received said secondary light;

detecting said secondary light; and using said secondary light to control said machining.

20. The laser machining method as set forth in claim 19, wherein said using step comprises at least one of:

(a) detecting the focal position of a laser optical system;

(b) detecting the completion of piercing;

(c) detecting a piercing fault; and (d) detecting a machining status.

21. The laser machining method as set forth in claim 19, wherein said using step comprises at least one of:

(a) controlling the laser oscillator oscillation condition;

(b) controlling the cutting gas state;

(c) controlling the laser beam focal position;

(d) controlling a feedrate; and (e) controlling a nozzle state.

22. A laser machining method as defined in claim 19, wherein said using step comprises: controlling movement along a machining path of said workpiece.

23. A laser machining method as defined in claim 19, wherein said using step comprises the steps of:

(1) using the output signal of a light sensor to detect the offset of at least one of a cutting head nozzle and an optical system from the beam axis of the laser beam; and (2) compensating for the offset of at least one of said nozzle or and said optical system from the beam axis of said laser beam.

24. A laser machining method as defined in claim 19, wherein said using step comprises the steps of:

(1) using the output signal of a light sensor to detect the inclination of at least one of a resonator mirror and a light guiding path mirror; and (2) changing the inclination of at least one of said resonator mirrors and said light guiding path mirror to compensate for the beam axis offset.

25. A laser machining method as defined in claim 19, wherein the using step comprises the steps of:

(1) using the output signal of the light sensor to detect the beam mode of the laser beam; and (2) controlling at least one active supporting mechanism to compensate for said beam mode.

* * * * *